(12) United States Patent
Shanmugam et al.

(10) Patent No.: US 10,810,109 B2
(45) Date of Patent: Oct. 20, 2020

(54) ARCHITECTURE FOR REMOTING LANGUAGE SERVICES

(71) Applicant: Microsoft Technology Licensing, LLC, Redmond, WA (US)

(72) Inventors: Kesavan Shanmugam, Redmond, WA (US); Srivatsn Narayanan, Bothell, WA (US); Jason Ronald William Ramsay, Seattle, WA (US); Erich Gamma, Gutenswil (CH); Dirk Baumer, Feldmeilen (CH); Charles Eric Lantz, Burnsville, MN (US); Jonathan Preston Carter, Seattle, WA (US); Simon Calvert, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 15/879,289

(22) Filed: Jan. 24, 2018

(65) Prior Publication Data
US 2019/0149346 A1    May 16, 2019

Related U.S. Application Data

(60) Provisional application No. 62/585,988, filed on Nov. 14, 2017.

(51) Int. Cl.
*G06F 15/16* (2006.01)
*G06F 11/36* (2006.01)
(Continued)

(52) U.S. Cl.
CPC ............ *G06F 11/3664* (2013.01); *G06F 8/30* (2013.01); *G06F 8/33* (2013.01); *G06F 8/41* (2013.01);
(Continued)

(58) Field of Classification Search
CPC ............ G06F 11/3664; G06F 11/3632; G06F 11/3636; G06F 8/30; G06F 8/33;
(Continued)

(56) References Cited

U.S. PATENT DOCUMENTS

| 5,361,360 | A | 11/1994 | Ishigami et al. |
| 5,535,375 | A | 7/1996 | Eshel et al. |

(Continued)

OTHER PUBLICATIONS

"Real-Time Collaborative Coding in a Web IDE" by Max Goldman et al, ACM, pp. 155-164. (Year: 2011).*

(Continued)

*Primary Examiner* — Philip B Tran
(74) *Attorney, Agent, or Firm* — Workman Nydegger

(57) ABSTRACT

A collaboration session is provided in which an owner computer system and a participant computer system are both members. While working within this session, the participant computer system is provided access to a multi-file workspace that is stored locally on the owner computer system. The owner computer system receives a request from the participant computer system. The request is used to gain access to the owner computer system's language service. In response to this request, the owner computer system remotes its language service so that the language service is accessible to the participant computer system.

20 Claims, 13 Drawing Sheets

(51) Int. Cl.
| | |
|---|---|
| *H04L 29/06* | (2006.01) |
| *G06F 16/176* | (2019.01) |
| *G06F 9/52* | (2006.01) |
| *G06F 9/54* | (2006.01) |
| *H04L 12/18* | (2006.01) |
| *G06Q 10/10* | (2012.01) |
| *G06F 40/166* | (2020.01) |
| *G06F 40/197* | (2020.01) |
| *H04L 29/08* | (2006.01) |
| *G06F 8/71* | (2018.01) |
| *G06F 21/62* | (2013.01) |
| *G06F 8/33* | (2018.01) |
| *G06F 8/41* | (2018.01) |
| *G06F 16/18* | (2019.01) |
| *G06F 16/13* | (2019.01) |
| *G06F 16/17* | (2019.01) |
| *G06F 8/30* | (2018.01) |
| *G06F 3/0482* | (2013.01) |
| *G06F 3/0484* | (2013.01) |

(52) U.S. Cl.
CPC ............... *G06F 8/71* (2013.01); *G06F 9/52* (2013.01); *G06F 9/542* (2013.01); *G06F 9/543* (2013.01); *G06F 11/362* (2013.01); *G06F 11/3632* (2013.01); *G06F 11/3636* (2013.01); *G06F 11/3668* (2013.01); *G06F 16/13* (2019.01); *G06F 16/176* (2019.01); *G06F 16/1734* (2019.01); *G06F 16/1873* (2019.01); *G06F 21/6218* (2013.01); *G06F 40/166* (2020.01); *G06F 40/197* (2020.01); *G06Q 10/101* (2013.01); *H04L 12/1813* (2013.01); *H04L 12/1822* (2013.01); *H04L 63/08* (2013.01); *H04L 65/1069* (2013.01); *H04L 65/403* (2013.01); *H04L 67/02* (2013.01); *H04L 67/14* (2013.01); *G06F 3/0482* (2013.01); *G06F 3/0484* (2013.01); *H04L 67/141* (2013.01)

(58) Field of Classification Search
CPC ... G06F 8/41; G06F 8/71; G06F 17/24; G06F 21/6218; H04L 12/1813; H04L 63/08; H04L 65/1069; H04L 65/403; H04L 67/02
USPC .................................................. 709/204, 217
See application file for complete search history.

(56) References Cited

U.S. PATENT DOCUMENTS

| | | | |
|---|---|---|---|
| 6,405,364 B1 | 6/2002 | Bowman-Amuah | |
| 7,249,314 B2 | 7/2007 | Walker et al. | |
| 7,359,990 B2 | 4/2008 | Munir et al. | |
| 7,734,685 B2* | 6/2010 | Cheng .................... | G06Q 10/10 709/203 |
| 7,774,703 B2 | 8/2010 | Junuzovic et al. | |
| 7,805,702 B2 | 9/2010 | Jacovi et al. | |
| 7,904,418 B2 | 3/2011 | Agrawal et al. | |
| 8,032,470 B1* | 10/2011 | Heidenreich .......... | G06Q 10/10 706/45 |
| 8,196,029 B1 | 6/2012 | Rucker et al. | |
| 8,230,348 B2 | 7/2012 | Peters et al. | |
| 8,234,620 B1 | 7/2012 | Bychkov et al. | |
| 8,321,483 B2 | 11/2012 | Serlet et al. | |
| 8,434,002 B1 | 4/2013 | Shah et al. | |
| 8,789,014 B2 | 7/2014 | Robison et al. | |
| 8,819,617 B1 | 8/2014 | Koenig et al. | |
| 9,026,652 B1 | 5/2015 | Piehler et al. | |
| 9,244,817 B2 | 1/2016 | Cai et al. | |
| 9,268,670 B1 | 2/2016 | Lachwani et al. | |
| 9,465,784 B1 | 10/2016 | Hagopian et al. | |
| 9,483,259 B1 | 11/2016 | Lee et al. | |
| 9,729,615 B2 | 8/2017 | Nair | |
| 10,049,028 B2 | 8/2018 | Tucker et al. | |
| 10,055,205 B2 | 8/2018 | Di Balsamo et al. | |
| 10,261,885 B2 | 4/2019 | Tucker et al. | |
| 2002/0056003 A1 | 5/2002 | Goswami | |
| 2002/0129106 A1 | 9/2002 | Gutfreund | |
| 2004/0003119 A1 | 1/2004 | Munir et al. | |
| 2004/0234315 A1 | 11/2004 | Colwell et al. | |
| 2004/0261064 A1 | 12/2004 | Goldstein et al. | |
| 2005/0172168 A1 | 8/2005 | Kilian | |
| 2006/0195894 A1 | 8/2006 | Nita et al. | |
| 2007/0220479 A1 | 9/2007 | Hughes | |
| 2008/0005235 A1* | 1/2008 | Hegde .................... | G06Q 10/10 709/204 |
| 2008/0028323 A1* | 1/2008 | Rosen .................... | G06Q 10/10 715/752 |
| 2008/0059941 A1 | 3/2008 | Payne et al. | |
| 2008/0120564 A1 | 5/2008 | Balasubramanian et al. | |
| 2009/0021855 A1 | 1/2009 | Fasen | |
| 2009/0125518 A1 | 5/2009 | Bailor et al. | |
| 2009/0133033 A1 | 5/2009 | Lindo et al. | |
| 2009/0245843 A1 | 10/2009 | Sato | |
| 2009/0249224 A1 | 10/2009 | Davis et al. | |
| 2009/0254843 A1 | 10/2009 | Van wie et al. | |
| 2009/0271708 A1 | 10/2009 | Peters et al. | |
| 2010/0057865 A1 | 3/2010 | Chan et al. | |
| 2010/0174783 A1 | 7/2010 | Zarom | |
| 2010/0191785 A1 | 7/2010 | Serlet et al. | |
| 2010/0257457 A1 | 10/2010 | De Goes | |
| 2011/0296300 A1 | 12/2011 | Parker | |
| 2012/0023418 A1 | 1/2012 | Frields et al. | |
| 2012/0047295 A1 | 2/2012 | Wong | |
| 2012/0084758 A1 | 4/2012 | Bates | |
| 2012/0102459 A1 | 4/2012 | Bates | |
| 2012/0102460 A1 | 4/2012 | Bates | |
| 2012/0102463 A1 | 4/2012 | Bates | |
| 2012/0102464 A1 | 4/2012 | Bates | |
| 2012/0102465 A1 | 4/2012 | Bates | |
| 2012/0102466 A1 | 4/2012 | Bates | |
| 2012/0102467 A1 | 4/2012 | Bates | |
| 2012/0117457 A1 | 5/2012 | Yuniardi | |
| 2012/0117541 A1 | 5/2012 | Bates | |
| 2012/0117542 A1 | 5/2012 | Bates | |
| 2012/0117543 A1 | 5/2012 | Bates | |
| 2012/0137268 A1 | 5/2012 | Dattke | |
| 2012/0151446 A1 | 6/2012 | Sathya et al. | |
| 2012/0246610 A1 | 9/2012 | Asadullah et al. | |
| 2012/0254773 A1* | 10/2012 | Viswanathan ........ | G06F 3/0483 715/753 |
| 2012/0272216 A1 | 10/2012 | Bates | |
| 2012/0272217 A1 | 10/2012 | Bates | |
| 2012/0272218 A1 | 10/2012 | Bates | |
| 2012/0272219 A1 | 10/2012 | Bates | |
| 2012/0278388 A1 | 11/2012 | Kleinbart et al. | |
| 2012/0278790 A1 | 11/2012 | Bates | |
| 2012/0297363 A1 | 11/2012 | Perisic et al. | |
| 2012/0317552 A1 | 12/2012 | Bates | |
| 2012/0331351 A1 | 12/2012 | Davis et al. | |
| 2012/0331404 A1 | 12/2012 | Buford et al. | |
| 2013/0007716 A1 | 1/2013 | Bates | |
| 2013/0185252 A1 | 7/2013 | Palmucci | |
| 2013/0205203 A1 | 8/2013 | Macdougall et al. | |
| 2013/0247004 A1 | 9/2013 | Deluca et al. | |
| 2013/0262373 A1 | 10/2013 | Rampson | |
| 2013/0275312 A1 | 10/2013 | Claman et al. | |
| 2013/0275948 A1 | 10/2013 | Bates et al. | |
| 2014/0047356 A1 | 2/2014 | Baumberghen et al. | |
| 2014/0173565 A1 | 6/2014 | Scholl et al. | |
| 2014/0289645 A1 | 9/2014 | Megiddo et al. | |
| 2015/0033078 A1 | 1/2015 | Wintergerst et al. | |
| 2015/0040101 A1 | 2/2015 | Rummler et al. | |
| 2015/0106790 A1 | 4/2015 | Bigwood et al. | |
| 2015/0135165 A1 | 5/2015 | Simernitski et al. | |
| 2015/0142949 A1 | 5/2015 | Nair | |
| 2015/0149404 A1 | 5/2015 | Lock et al. | |
| 2015/0193406 A1 | 7/2015 | Lemonik et al. | |
| 2016/0004529 A1 | 1/2016 | Xia et al. | |

(56) References Cited

U.S. PATENT DOCUMENTS

| | | |
|---|---|---|
| 2016/0092211 A1 | 3/2016 | Atanasiu et al. |
| 2016/0103662 A1 | 4/2016 | Di balsamo et al. |
| 2016/0112262 A1 | 4/2016 | Johnson et al. |
| 2016/0224337 A1 | 8/2016 | Xia et al. |
| 2016/0321291 A1 | 11/2016 | Malhotra et al. |
| 2017/0003835 A1 | 1/2017 | Shaffer et al. |
| 2017/0017779 A1 | 1/2017 | Huang et al. |
| 2017/0083490 A1 | 3/2017 | Kikin-gil et al. |
| 2017/0097822 A1 | 4/2017 | Deluca et al. |
| 2017/0168809 A1 | 6/2017 | Zander |
| 2017/0262294 A1 | 9/2017 | Yakan |
| 2017/0269926 A1 | 9/2017 | Xu |
| 2017/0353458 A1 | 12/2017 | Lipke et al. |
| 2017/0357486 A1 | 12/2017 | Deluca et al. |
| 2018/0004628 A1 | 1/2018 | Strong et al. |
| 2018/0121327 A1 | 5/2018 | Grebenschikov |
| 2018/0124155 A1 | 5/2018 | Ryzhkov et al. |
| 2018/0129584 A1 | 5/2018 | Somasundaram et al. |
| 2018/0157676 A1 | 6/2018 | Milvaney et al. |
| 2018/0181552 A1 | 6/2018 | Konnola et al. |
| 2019/0079909 A1 | 3/2019 | Purandare et al. |
| 2019/0129973 A1 | 5/2019 | Truong et al. |
| 2019/0146758 A1 | 5/2019 | Lantz et al. |
| 2019/0146783 A1 | 5/2019 | Ginchereau et al. |
| 2019/0146898 A1 | 5/2019 | Silva et al. |
| 2019/0146899 A1 | 5/2019 | Lantz et al. |
| 2019/0147048 A1 | 5/2019 | Pugh et al. |
| 2019/0278839 A1 | 9/2019 | Codrington et al. |

OTHER PUBLICATIONS

"Final Office Action Issued in U.S. Appl. No. 15/879,261", dated Jun. 20, 2019, 22 Pages.

"JSON-RPC 2.0 Specification", Retrieved From: <<http://www.jsonrpc.org/specification>>, Mar. 26, 2010, 7 Pages.

"Non Final Office Action Issued in U.S. Appl. No. 15/879,256", dated Aug. 14, 2019, 20 Pages.

"Non Final Office Action Issued in U.S. Appl. No. 15/879,266", dated Aug. 8, 2019, 20 Pages.

"Non Final Office Action Issued in U.S. Appl. No. 15/879,296", dated Aug. 22, 2019, 21 Pages.

"Software build", Retrieved From: https://en.wikipedia.org/wiki/Software_build, Retrieved Date: Oct. 29, 2018, 2 Pages.

"Non Final Office Action Issued in U.S. Appl. No. 15/879,256", dated Sep. 20, 2018, 17 Pages.

"Non Final Office Action Issued in U.S. Appl. No. 15/879,261", dated Oct. 5, 2018, 26 Pages.

"Non Final Office Action Issued in U.S. Appl. No. 15/879,266", dated Nov. 2, 2018, 21 Pages.

"Non Final Office Action Issued in U.S. Appl. No. 15/879,296", dated Nov. 2, 2018, 20 Pages.

"Final Office Action Issued in U.S. Appl. No. 15/879,256", dated May 3, 2019, 17 Pages.

"Final Office Action Issued in U.S. Appl. No. 15/879,266", dated May 2, 2019, 21 Pages.

"Final Office Action Issued in U.S. Appl. No. 15/879,296", dated May 16, 2019, 20 Pages.

Gousset, Mickey, "Visual Studio Collaboration, Anywhere", Retrieved From: https://visualstudiomagazine.com/articles/2013/06/03/visual-studio-collaboration-anywhere.aspx, Jun. 3, 2013, 5 Pages.

Heydarian, Habib, "One bug, two developers: Collaborative debugging is now a Reality in Visual Studio 2010", Retrieved From: https://blogs.msdn.microsoft.com/habibh/2009/12/01/one-bug-two-developers-collaborative-debugging-is-now-a-reality-in-visual-studio-2010/, Dec. 1, 2009, 16 Pages.

"Non Final Office Action Issued in U.S. Appl. No. 15/879,261", dated Oct. 28, 2019, 24 Pages.

"Notice of Allowance Issued in U.S. Appl. No. 15/879,266", dated Nov. 21, 2019, 9 Pages.

Nezha, et al., "Extending Cloud Studio with Collaborative Remote Debugger", In Master of Science Thesis, Dec. 20, 2012, 139 Pages.

Wang, et al., "A Dual-Mode Exerciser for a Collaborative Computing Environment", In IEEE 11th Asia-Pacific Software Engineering Conference, Nov. 30, 2004, 9 Pages.

Zhang, et al., "CDebugger: A Scalable Parallel Debugger with Dynamic Communication Topology Configuration", In International Conference on Cloud and Service Computing, Dec. 12, 2011, pp. 228-234.

"The Vs Code Team: Common Language Server Protocol", Retrieved From: https://code.visualstudio.com/blogs/2016/06/27/common-language-protocol, Jun. 27, 2016, 4 Pages.

Barbero, Mikael, "The Language Server Protocol: Why the Hype?", Retrieved From: https://www.slideshare.net/mikaelbarbero/language-server-protocol-why-the-hype, Jul. 29, 2017, 72 Pages.

Estler, et al., "Collaborative Debugging", In Proceedings of the IEEE 8th International Conference on Global Software Engineering, Aug. 26, 2013, pp. 110-119.

Goldman, et al., "Real-Time Collaborative Coding in a Web IDE", In Proceedings of the 24th Annual ACM Symposium on User Interface Software and Technology, Oct. 16-19, 2011, pp. 155-164.

Keidel, Sven, "A Disintegrated Development Environment", Retrieved From: http://www.informatik.uni-marburg.de/~seba/teaching/thesis-keidel.pdf, Apr. 9, 2015, 47 Pages.

"International Search Report and Written Opinion Issued in PCT Application No. PCT/US18/059714", dated Feb. 21, 2019, 11 Pages.

"International Search Report and Written Opinion Issued in PCT Application No. PCT/US18/059715", dated Feb. 21, 2019, 13 Pages.

"International Search Report and Written Opinion Issued in PCT Application No. PCT/US18/059716", dated Feb. 21, 2019, 12 Pages.

"International Search Report and Written Opinion Issued in PCT Application No. PCT/US18/059717", dated Feb. 19, 2019, 13 Pages.

"International Search Report and Written Opinion Issued in PCT Application No. PCT/US18/059718", dated Feb. 18, 2019, 12 Pages.

"International Search Report and Written Opinion Issued in PCT Application No. PCT/US18/059719", dated Feb. 19, 2019, 15 Pages.

"Final Office Action Issued in U.S. Appl. No. 15/879,261", dated Feb. 25, 2020, 25 Pages.

"Non-Final Office Action Issued in U.S. Appl. No. 15/948,714", dated Apr. 3, 2020, 15 Pages.

"Final Office Action Issued in U.S. Appl. No. 15/879,256", dated Feb. 4, 2020, 18 Pages.

"Final Office Action Issued in U.S. Appl. No. 15/879,296", dated Feb. 21, 2020, 22 Pages.

"Non Final Office Action Issued in U.S. Appl. No. 15/879,256", dated Jun. 23, 2020, 18 Pages.

"Non Final Office Action Issued in U.S. Appl. No. 15/879,261", dated Jun. 24, 2020, 24 Pages.

"Notice of Allowance Issued in U.S. Appl. No. 15/948,714", dated Jul. 23, 2020, 20 Pages.

* cited by examiner

```
1
2  -- Function
4
5  {
6    "type": "2.1.0",
7    "name": "vscode",
8  c
9    ┌─────────────────┐
10   │ 🔧 categories   │
11   │ 🔧 config       │  ~ 1010
12   │ 🔧 contributor  │
13   │ 🔧 cpu          │
14   └─────────────────┘
```

ARCHITECTURE FOR REMOTING LANGUAGE SERVICES

CROSS-REFERENCE TO RELATED APPLICATIONS

This application claims priority to U.S. Provisional Application Ser. No. 62/585,988, filed on Nov. 14, 2017 and entitled "MULTI-FILE REAL-TIME COLLABORATION ENVIRONMENT," the entirety of which is incorporated herein by reference.

BACKGROUND

Computers and computing systems have impacted nearly every aspect of modern-day living. For instance, computers are generally involved in work, recreation, healthcare, transportation, and so forth.

A computer operates by executing a set of executable instructions (i.e. code). These instructions were created in a development environment by a developer in order to create an application. In many instances, the developer will generate many different versions of the code in an effort to improve the computer's operations and to remove any bugs that are present in the code. Once the instructions are compiled, interpreted, and/or built, an underlying computer system executes the instructions to provide the application's functionalities.

Different tools have been created to assist a developer in writing, editing, testing, and debugging an application's executable instructions. Some of these tools include program code text editors, source code editors, debuggers, and integrated development environments (IDEs), just to name a few. The process of generating and debugging code can be improved through the participation of additional developers. For example, by working together in a team, team members are able to jointly collaborate to review and improve a project.

The subject matter claimed herein is not limited to embodiments that solve any disadvantages or that operate only in environments such as those described above. Rather, this background is provided to illustrate only one example technology area where some embodiments described herein may be practiced.

BRIEF SUMMARY

At least some of the embodiments described herein relate to establishing a collaboration session so that multiple collaborators are able to jointly edit source code. For example, a collaboration session in which an owner computer system and a participant computer system are both members is established. Within this collaboration session, the owner and participant computer systems are provided access to a multi-file workspace that is stored on the owner computer system. Further, the owner computer system is able to receive a request from the participant computer system. This request is used to gain access to the owner computer system's language service. In response to this request, the owner computer system remotes its language service so that the language service is accessible to the participant computer system.

Accordingly, the disclosed embodiments are able to remote the language services of one computer system to another computer system. In this manner, the embodiments improve how a computer system operates because the embodiments are able to make better use of the computer system's language services. Additional benefits will be described later.

This Summary is not intended to identify key or essential features of the claimed subject matter nor is it intended to be used as an aid in determining the scope of the claimed subject matter. Instead, this Summary is provided to introduce a selection of concepts in a simplified form. These concepts are more fully described below in the Detailed Description.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered limiting, the embodiments will be described and explained with additional specificity and detail through the use of the accompanying drawings in which:

FIG. 10 illustrates some of the features that are provided by a language service.

DETAILED DESCRIPTION

Figure 1:
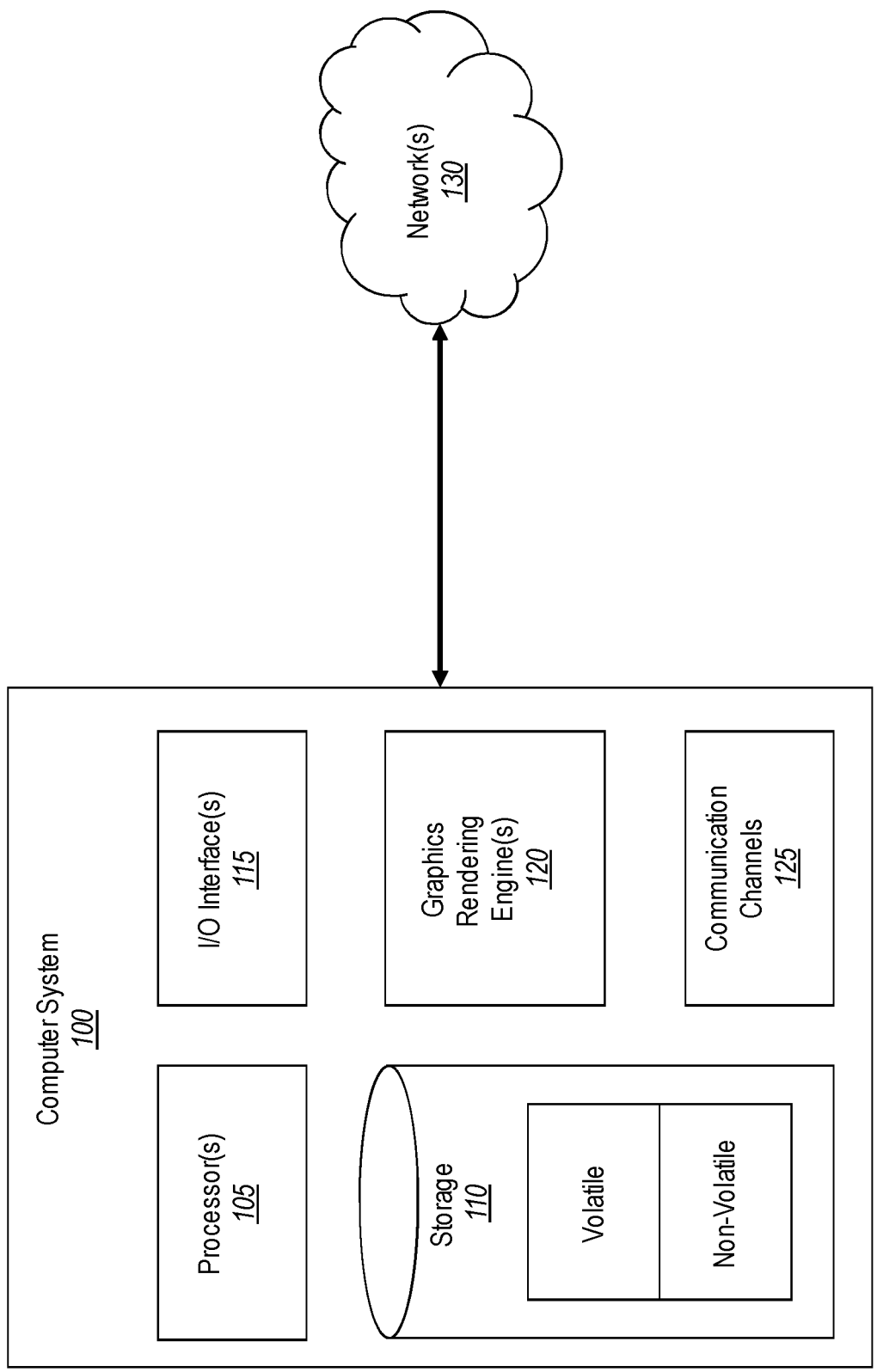
FIG. 1 illustrates an overall view of a computer system.

At least some of the embodiments described herein relate to establishing a collaboration session so that multiple collaborators are able to jointly edit source code. For example, a collaboration session in which an owner computer system and a participant computer system are both members is established. Within this collaboration session, the owner and participant computer systems are provided access to a multi-file workspace that is stored on the owner computer system. Further, the owner computer system is able to receive a request from the participant computer system. This request is used to gain access to the owner computer system's language service. In response to this request, the owner computer system remotes its language service so that the language service is accessible to the participant computer system.

An advantage of the disclosed embodiments is that they allow an "owner collaborator" (or simply "owner") to remain in control of his/her multi-file workspace even when outside collaborators (also called hereinafter "participant collaborators" or simply "participant(s)") are joined with the owner in a "collaborative session." Here, the term "owner" can refer to either a "human owner" or an "owner computer system." Similarly, the term "participant" can refer to either a "human participant" or a "participant computer system." In contrast, an "owner computer system" and a "participant computer system" refer only to a computer system and do not include a human operator. Additionally, "collaborator" refers to any entity (e.g., an owner or a participant) that has joined a collaboration session while "collaborators" refers to some or all of the entities in the collaboration session (e.g., the owner and all of the participants).

As also used herein, a "multi-file workspace" is an assembly of multiple files that operate collectively by interacting with each other. As an example, a code development project may include multiple files of source code that, when executed, operate together to perform complex functions. Thus, a code development project may be considered a multi-file workspace. Other examples of a multi-file workspace include, but are not limited to, text files and/or word processing files (e.g., where the files are linked via a table of contents or some other linking unit), or any other content in which multiple sources of data are joined together. Yet another non-limiting example of a multi-file workspace is a wiki-based workspace that is configured to receive edits and/or markdowns from multiple entities. Accordingly, from this disclosure, it will be appreciated that the embodiments are able to operate with regard to any kind of multi-file workspace. For the sake of brevity, and by way of example only, the remaining portion of this disclosure will focus on a multi-file workspace that includes multiple files of source code.

Here, it is also worthwhile to note that a "collaboration session," as used herein, is an occurrence in which an owner computer system is joined with one or more participant computer systems in order to jointly collaborate on a multi-file workspace. During this collaboration session, the participant computer systems are provided access to a multi-file workspace that is stored locally on the owner computer system. In this manner, the participants need not download the multi-file workspace. Instead, the participant computer systems act as headless units because editing and other operations may be performed on the owner computer system as opposed to occurring on each of the participant computer systems.

Of note, collaboration sessions may be initiated for a broad variety of reasons. For example, in some instances, a collaboration session may be established so that the participants can assist the owner in performing a certain function. For instance, if the collaboration involves debugging, the owner might be the primary person tasked with generating the code, whereas the participants may be other developers who are helping the owner debug that code. In a learning environment, the owner may be a student, and the participant may be a teacher. In an alternative learning environment, a professor may be the owner and his/her students may be the participants. In such a scenario, the professor is able to guide his/her students in demonstrating how the workspace operates. In this context, the owner is able to retain administrative control over his/her multi-file workspace.

Yet another example scenario includes a coding interview process in which the interviewer sets up a workspace environment (e.g., a coding environment). Here, the interviewer is the owner and the interviewee is the participant. In another example scenario, an owner need not be a human on one end of the system. Instead, an owner computer system may be a build server that has no human owner. In this scenario, as will be discussed in more detail later, a human participant, who is using a participant computer system, is able to join a remote codebase (i.e. an "owner" build instance) for the purpose of collaborating in a debugging scenario. Of note, in situations where the owner is a build instance, the disclosed embodiments enable one (or perhaps more) of the participants to assume control of the multi-file workspace. Relatedly, a participant is also able to assume ownership for specific changes to the multi-file workspace.

Having just described some of the situations in which the embodiments may be practiced, the disclosure will now introduce some of the technical benefits that are provided herein. For example, the disclosed embodiments may be implemented to overcome many of the technical difficulties and computational expenses associated with jointly controlling and collaborating on a multi-file workspace. To illustrate, conventional methods for debugging an application often involve each collaborator installing a workspace's global environment/context and then applying the same data (or steps) in order to reproduce the exact issues that led to finding a bug. Such a process consumes a significant amount of time, computing resources, and manpower. As used herein, the term "context" refers to the state of a workspace.

In contrast, the disclosed embodiments provide significant advantages because they enable multiple computers to connect to a single computer, which is running a workspace's environmental logic (e.g., services) and which is maintaining a global context of the workspace, to thereby allow the collaborators to jointly collaborate on the multi-file workspace (as opposed to having multiple different workspaces operating on multiple different computers). These operations result in a significant increase in the overall efficiency of the collaborating computer systems.

Another advantage of the disclosed embodiments is that because only a single workspace is being operated on, the collaborators' operations are synchronized with each other. For example, when multiple collaborators (e.g., code developers) are joined together in a collaborative session, each collaborator is made aware (in real-time) of at least some, and potentially all, of the actions of all of the other collaborators because each collaborator is working on the same workspace. In other words, each collaborator's individual action is "synced" with the actions of the other collaborators.

Having just described various advantages and high-level attributes of some of the disclosed embodiments, the disclosure will now focus on FIG. 1 which presents an introductory discussion of an example computer system. Following that discussion, the disclosure will focus on FIGS. 2 through 9. In particular, these Figures illustrate various architectures and supporting illustrations for providing a collaboration session according to the disclosed principles. Finally, the disclosure will focus on FIGS. 10 through 13 which illustrate various architectures, user interfaces, and methods for remoting the language service of one computer system to another computer system.

Example Computer System

As illustrated in FIG. 1, in its most basic configuration, a computer system 100 includes various different components.

For example, FIG. 1 shows that computer system 100 includes at least one hardware processing unit 105 (aka "processor"), storage 110, input/output (I/O) interfaces 115, graphics rendering engines 120, and various communication channels 125.

The storage 110 may be physical system memory, which may be volatile, non-volatile, or some combination of the two. Accordingly, the storage 115 may be referred to as a "hardware storage device" on which computer-executable instructions are stored. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g., as separate threads).

The disclosed embodiments may comprise or utilize a special-purpose or general-purpose computer including computer hardware, such as, for example, one or more processors (such as hardware processing unit 105) and system memory (such as storage 110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., data acquisition devices). Further, the computer system 100 may also be connected through one or more wired or wireless network(s) 130 to remote systems(s) that are configured to perform any of the processing described with regard to computer system 100.

The graphics rendering engine 120 is configured, with the processor(s) 105, to render one or more objects on a display of the computer system 100. As a result, a user is able to view the results of the various functionalities of the computer system 100.

A "network," like the network(s) 130 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated the computer system 100 includes one or more communication channels 125 that are used to communicate with the network(s) 130. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

As discussed above, computer systems are able to provide a broad variety of different functions. According to the principles disclosed herein, the embodiments are able to provide a multi-file real-time collaboration environment. Accordingly, attention will now be directed to FIGS. 2 through 9, which figures present various architectures and supporting illustrations for establishing a collaboration session.

Collaboration Session

Figure 2:
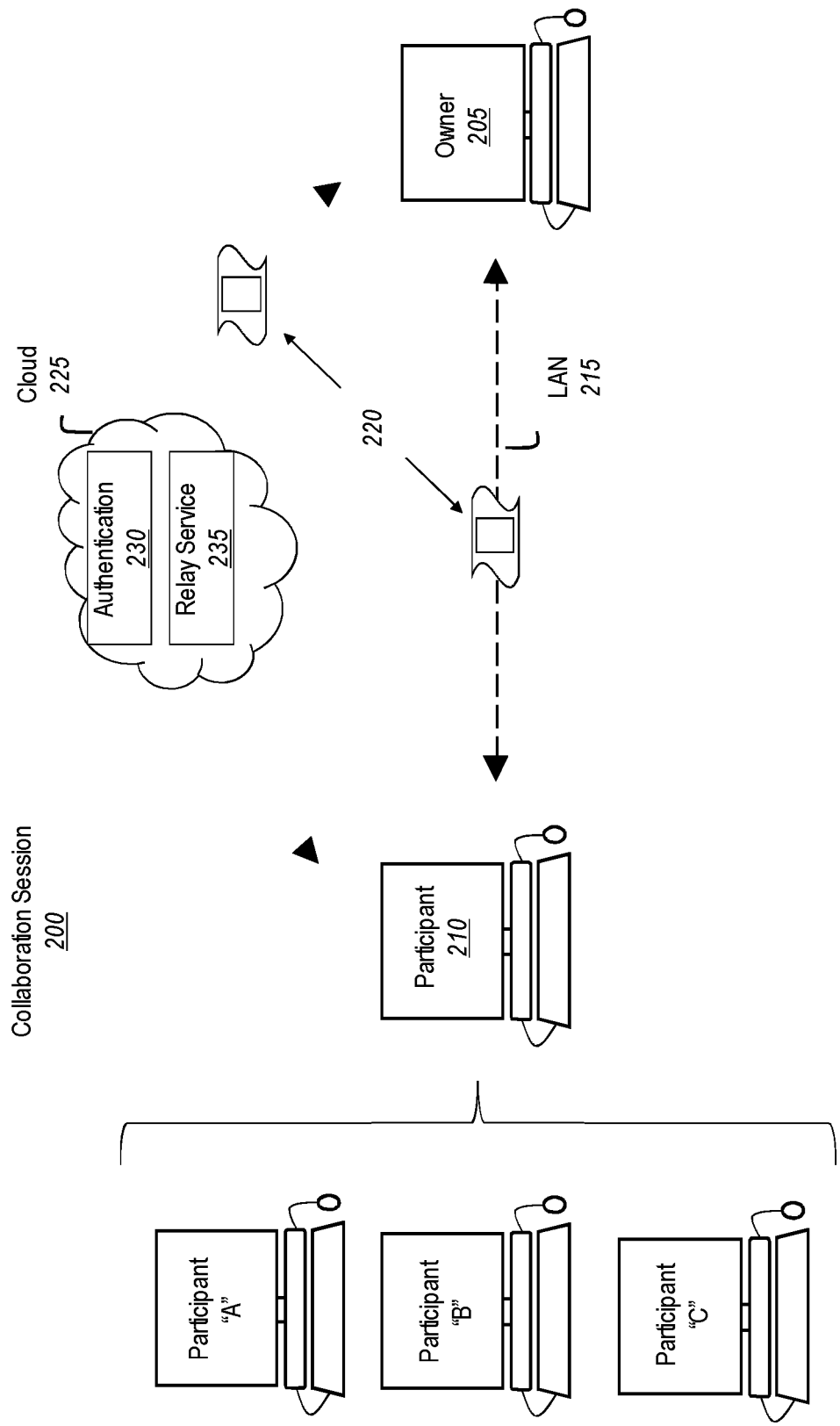
FIG. 2 provides an example depiction of how a collaboration session may be initiated.

FIG. 2 illustrates a collaboration session 200 in which an owner computer system 205 and a participant computer system 210 are both members. Notably, both the owner computer system 205 and the participant computer system 210 may include all of the features and functionalities that were discussed in relation to the computer system 100 of FIG. 1. Accordingly, when reference is made to a "computer system," it will be appreciated that such a system may include the features of computer system 100.

Here, it will be appreciated that there may be any number of participant computer systems in the collaboration session 200. For instance, FIG. 2 shows that Participant "A," Participant "B," and/or Participant "C" may be included in the collaboration session 200. As a result, the owner computer system 205 may be a first member in the collaboration session 200, Participant "A" may be a second member in the collaboration session 200, Participant "B" may be a third member in the collaboration session (i.e. three or more members are joined), and so on with potentially no limit. Accordingly, FIG. 2 is for example purposes only and should not be considered limiting. Furthermore, the remaining portion of this disclosure focuses on collaboration sessions that depict only a single participant; however, it should be understood that the principles may be practiced with any number of participants.

Returning to FIG. 2, the disclosed embodiments establish the collaboration session 200 so that the participant computer system 210 is able to gain access to a multi-file workspace stored on the owner computer system 205. In this manner, the participant computer system 210 can operate on the remote workspace as if the remote workspace were local. For instance, a human participant can independently view, edit, and otherwise operate on the remote workspace. By creating this type of collaboration session, all of the collaborators (e.g., the owner and participant(s)) are all able to collaborate on a single multi-file workspace. Accordingly, the disclosed embodiments provide many efficiencies over traditional collaboration processes.

Here, the collaboration session 200 may be initiated in a variety of ways. In some embodiments, the collaborators (e.g., the owner computer system 205 and the participant computer system 210) are able to communicate with each other over a local area network (LAN) connection 215. When this type of connection is available, then the collaboration session 200 may be initiated by sending a request 220 over the LAN connection 215. In this manner, the collaborators are able to communicate directly in a peer-to-peer manner.

Of note, in some instances, the owner computer system 205 may desire that the participant computer system 210 be authenticated prior to entering the collaboration session 200. As such, the embodiments are able to use the cloud 225 to provide authentication services. For example, some embodiments provide an authentication service 230 in the cloud 225. The participant computer system 210 can use this authentication service 230 to authenticate itself to the owner computer system 205. After the authentication is complete, then the collaboration session 200 can be initiated and the owner computer system 205 and the authenticated participant computer system 210 can jointly work on a multi-file workspace.

In other embodiments, the collaboration session 200 is initiated by sending the request 220 through a relay service 235 operating in the cloud 225. Here, this relay service 235 is able to connect computers that are on different native networks. Accordingly, the embodiments are able to use various services residing in the cloud 225 in order to initiate the collaboration session 200.

Other embodiments use a hybrid approach to initiating the collaboration session 200. For instance, if some participant computer systems are located on the same LAN as the owner computer system 205, then the request 220 can be sent to those participant computer systems using the LAN. Additionally, if some participant computer systems are not using the same LAN as the owner computer system 205, then the request 220 can be transmitted using the relay service 235 in the cloud 225. Accordingly, the disclosed embodiments are able to use a variety of methods for initiating the collaboration session 200. Here, it is worthwhile to note that the disclosed embodiments are able to intelligently select whichever process is most efficient to initiate the collaboration session 200. On a related note, the collaboration session 200 is able to continue to use the respective network connections to maintain the communications between the collaborators.

Ending the collaboration session 200 may be performed in a variety of ways. In some embodiments, the collaboration session 200 ends through an action of one of the collaborators. For example, one of the collaborators may select an "End Collaboration" option.

In another embodiment, the collaboration session may end upon expiration of a time-out period. For example, the owner may have configured a policy controlling how long the collaboration session will remain active. Upon expiration of that period, the participants' connection to the collaboration session will be terminated. Additionally, the owner may set a policy indicating a time-out period associated with the shutting down of a client (e.g., an IDE). For example, the owner may set a time-out period to cause the collaboration session to terminate after a predetermined period of time has elapsed after the client was shut down. Such a feature is beneficial because it provides the collaborators adequate time to save any changes or to provide documentation within the code.

Alternatively, other embodiments are configured to end the collaboration session when the owner computer system shuts down and/or the owner logs off of the owner computer system. In yet another alternative embodiment, the collaboration session may continue to run even after the owner computer system has shut down, gone to sleep, or been logged off. As an example, suppose the human owner decided to perform a quick reboot or had to quickly attend a meeting. Here, because the collaboration session is still active (even though the owner computer system may not be active), the human owner will be able to quickly resume her work when she returns from her activities. An advantage realized by this embodiment is that if any configuration options are adjusted, then those adjustments can be persisted and will be in place for the remaining duration of the collaboration session. In this manner, the collaborators will be able to quickly resume working at the locations where they left off, and they can continue to operate using the same configuration options.

Other embodiments include audit tracking features that record each collaborators' actions (e.g., their edits). In this manner, these embodiments provide an audit trail that can be reviewed and analyzed at a later time, if the need or desire arises. Once the collaboration session ends based on the principles discussed above, then the audit tracking may also end.

Figure 3:
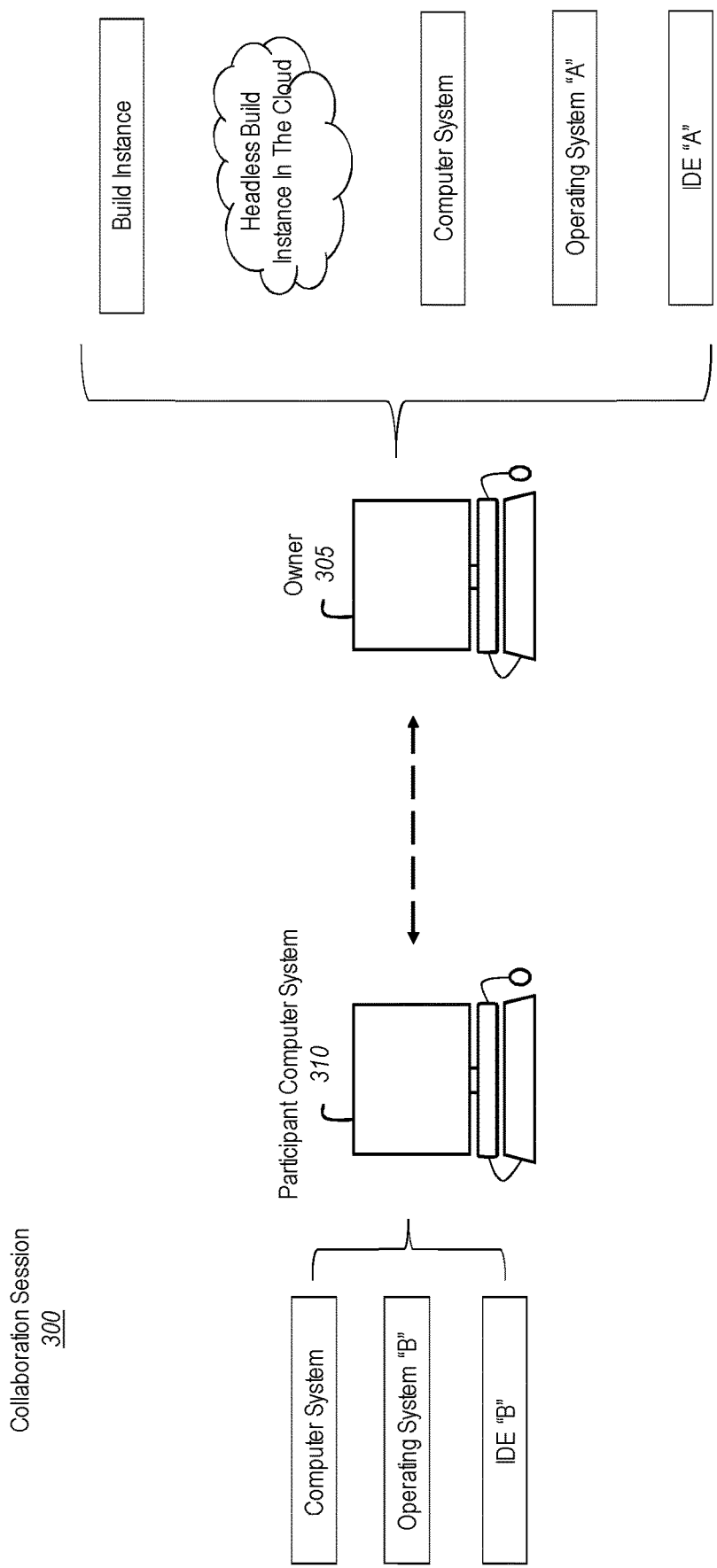
FIG. 3 illustrates the various forms and characteristics that a collaborator may have.

Similar to FIG. 2, FIG. 3 illustrates another collaboration session 300. Here, it will be appreciated that collaboration session 300 is analogous to the collaboration session 200 of FIG. 3. In the scenario presented in FIG. 3, the collaboration session 300 includes an owner 305 and a participant computer system 310.

In particular, FIG. 3 shows some of the various characteristics that the owner 305 and the participant computer system 310 may have. As an example, the owner 305 may not be a computer system with a human operator. Instead, it may be a build instance of an application, as shown in FIG. 3. On a related note, the owner 305 may be a headless build instance that is residing in the cloud. In such a scenario, then the various participants are able to operate on the codebase on which the build instance is based.

Alternatively, the owner 305 may be a computer system (as shown in FIG. 3) that is using a first type of operating system (e.g., Operating System "A"). In some situations, a human owner will operate the owner 305. Furthermore, the human owner is able to perform work on the multi-file workspace through the use of a client application that is residing on the owner 305. As used herein, a "client application" may be any type of application that enables the owner 305 to operate on the multi-file workspace. In situations where the multi-file workspace is a collection of text files, a client application may be a text editor, a word processing program, or any other program suitable to operate on the text files. In situations where the multi-file workspace is a collection of source code files, a client application may be a source code editor, an integrated development environment (IDE), or any other program suitable to operate on source code. Here, it will be appreciated that these client applications are provided permissions to access the multi-file workspace residing on the owner 305. Although FIG. 3 shows that the owner 305 is able to operate a client application that is in the form of an IDE (e.g., IDE "A"), it will be appreciated that any type of client application may be used, not just an IDE.

Turning now to the participant computer system 310, the participant computer system 310 may also be a computer system that is using an operating system (e.g., Operating System "B"). Here it is worthwhile to note that Operating System "B" may be different than Operating System "A." As a result, the owner 305 and the participant computer system 310 need not use the same type of operating system in order to be joined together in the collaboration session 300 to work on the multi-file workspace. Relatedly, the participant computer system 310 need not use the same type of client application (e.g., IDE "B") as the owner 305. Therefore, according to the principles disclosed herein, a participant is able to use his/her preferred operating system and client application regardless of the type of operating system and/or client application that the owner (e.g., owner 305) is using. Accordingly, the embodiments are operating system agnostic and client application agnostic.

Up to this point, the disclosure has presented some of the ways in which a collaboration session may be initiated and some of the characteristics of the collaborators. In light of that background, attention will now be directed to FIG. 4, which presents some architectural components that may be used to realize the benefits of the disclosed principles.

Figure 4:
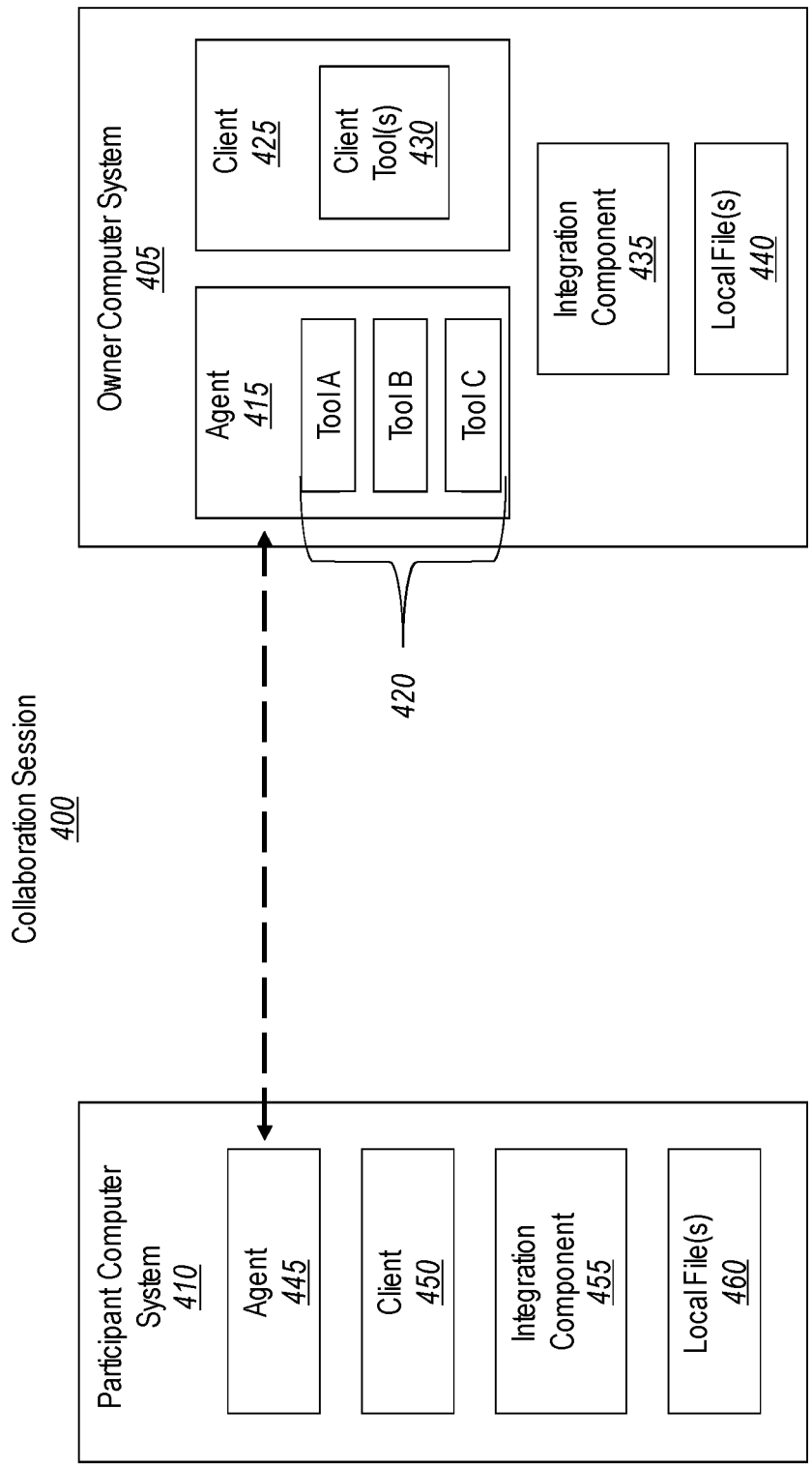
FIG. 4 illustrates an example architecture that may be used to facilitate a collaboration session.

FIG. 4 illustrates a collaboration session 400 in which an owner computer system 405 and a participant computer system 410 are members. Here, the owner computer system 405 is a computer system that includes a collaboration agent 415. As illustrated, this collaboration agent 415 includes a set of base tools 420 (e.g., Tool A, Tool B, and Tool C). Although FIG. 4 shows the collaboration agent 415 as including only three base tools, it will be appreciated that the collaboration agent 415 may include any number of base tools. Additional details on the base tools 420 will be presented momentarily.

The owner computer system 405 also includes a client application 425. As discussed earlier, a client application (e.g., client application 425) may be a text editor, word processing editor, source code editor, IDE, or any other type of application that enables a user to operate on a multi-file workspace. In light of that understanding, client application 425 may include a client tool 430. Similar to the above disclosure, although the client application 425 is shown as including only a single tool, it will be appreciated that the client application 425 may have any number of tools. Relatedly, the owner computer system 405 may have any number of client applications installed thereon. As an example, the client application 425 may be an integrated development environment (IDE) that has permissions to access the multi-file workspace. Further, this IDE may manage/host a set of client development tools. In this manner, the IDE can be used to work on the multi-file workspace.

Here, it will be appreciated that a base tool (e.g., Tool A, Tool B, or Tool C) may be a service or other type of function/tool that is generally common across many or all of the different types of client applications. For example, in the context of code editing, the base tools 420 may include a code completion service, a code debugging service (e.g., a source code error checking tool), a code highlighting service, a code navigation operation/service, a code colorization service (e.g., syntax highlighting in which different colors are applied to the syntax depending on what category a syntax term belongs to), a code refactoring service (e.g., restructuring code without altering its behavior), a code hinting service (e.g., code completion), a source code search tool, a source code control tool, and/or a lightbulb service (e.g., an icon service that provides an expanded display of options).

Additional services and tools include, but are not limited to, providing member lists, parameter information, symbol services, source code transpilation (e.g., changing the source code so it reads in a different coding language), hover features, smart typing abilities, and quick code information. Relatedly, the client tool 430 may be a tool that is specific to a particular client application and that is not generally common among different client applications. As an example, the client tool 420 may be a tool or service specific to a particular type of IDE.

According to the principles disclosed herein, the owner computer system 405 is able to make these set of development tools (i.e. both the set of base tools 420 and the client tool 430) accessible to the participant computer system 410. Because these tools reside on the owner computer system 405, the tools have access to the entire context of the multi-file workspace. By making the tools accessible to the participant computer system 410, a human participant is able to use the tools in light of the entire context of the multi-file workspace. In this manner, the collaborators are able to operate on the multi-file workspace using a set of tools that understand the workspace's entire context.

Returning to FIG. 4, the owner computer system 405 also includes an integration component 435 and a set of local files 440. In some embodiments, the multi-file workspace is included within the set of local files 440 on the owner computer system 405.

As discussed earlier, it is often desirable to enable a team of developers to jointly work on a project. According to the principles discussed here, the collaboration session 400 may be initiated so as to enable one or more participants (e.g., participant computer system 410) to join the owner computer system 405 in collaborating on a multi-file workspace that is stored locally on the owner computer system 405 (e.g., perhaps in the local files 440).

To achieve these benefits, the disclosed embodiments cause the integration component 435 to attach, or rather "hook," to the client application 425 in a lightweight manner. For example, the integration component 435 may be a plugin or other type of client extension that hooks into the client application 425 to perform "redirection," "rerouting," and customization operations. For example, the integration component 435 (which is on the owner computer system 405) is configured to add additional functionalities to the client application 425. Of note, these additional functionalities are at least directed to establishing and maintaining the collaboration session 400.

Figure 5:
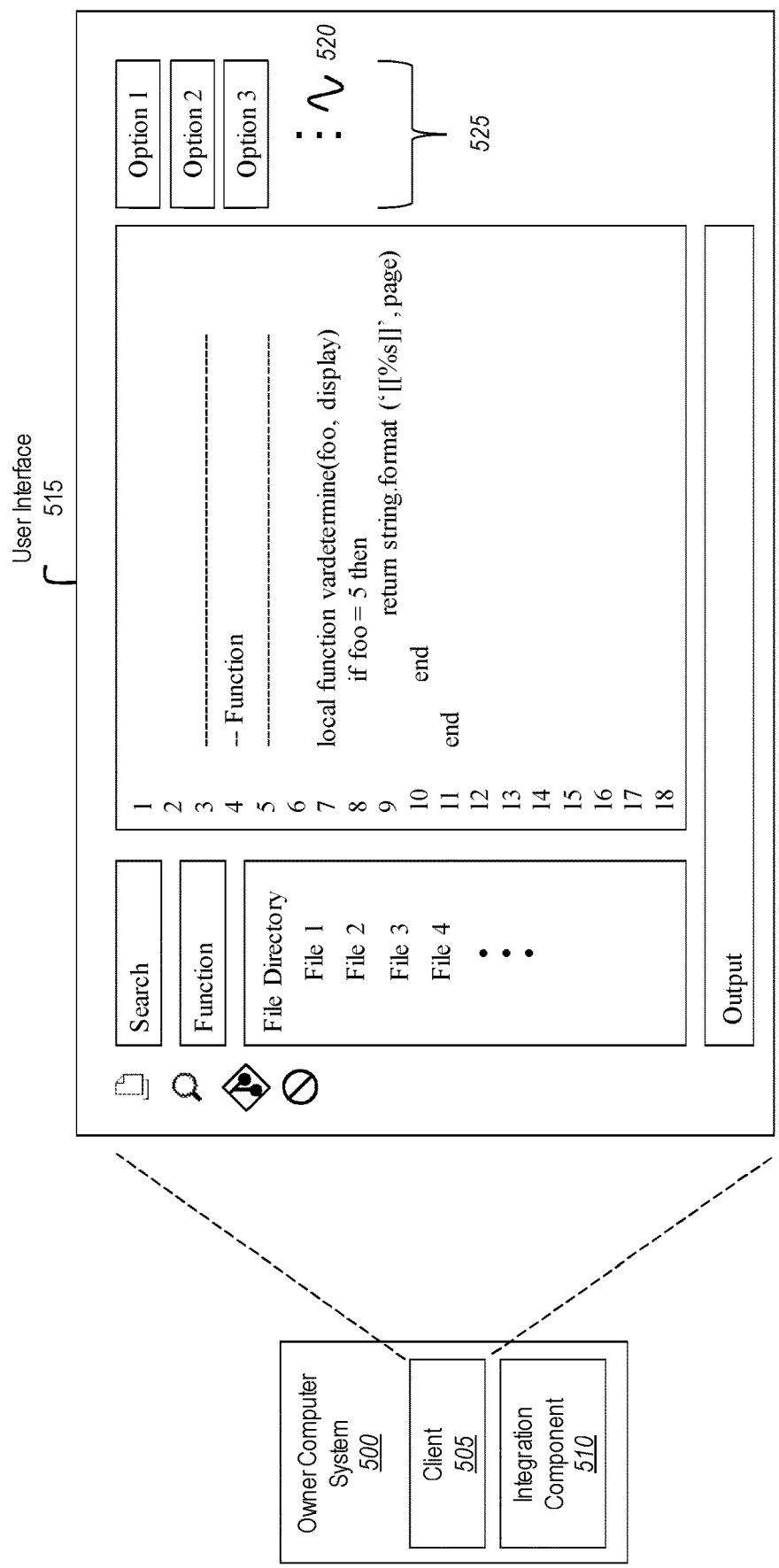
FIG. 5 shows how an integration component is able to configure a client application's user interface so that it includes collaboration options.

To illustrate, FIG. 5 shows an owner computer system 500, which is analogous to the owner computer system 405 of FIG. 4. In FIG. 5, the owner computer system 500 includes a client application 505 and an integration component 510. The client application 505 is also shown as including a user interface 515. After the integration component 510 hooks itself onto the client application 505, then the integration component 510 is able to expand upon the abilities of the client application 505.

For example, in some embodiments, the integration component 510 will alter the user interface 515 so that it includes additional features related to a collaboration session. To illustrate, a set of new collaboration options 525 have been added to the user interface 515 as a result of the integration component 510 attaching itself to the client application 505. The set of new collaboration options 525 include Option 1, Option 2, and Option 3. The ellipses 520 demonstrates that any number of options may be added to the user interface 515. Some of the set of collaboration options 525 may include, but are not limited to, (1) an option to initiate a collaboration session, (2) an option to terminate a collaboration session, and/or (3) an option to acquire information about a particular participant (e.g., the participant's avatar may be displayed and, when the avatar is selected, identifying information about the participant may be displayed).

Another option is a "pin" to participant's position option. As discussed, the embodiments enable a participant to work on a multi-file workspace that is stored locally on an owner computer system. Included with this functionality is the ability of the participant to independently navigate to areas within the multi-file workspace where the owner computer system is not currently operating (or even in locations where the owner computer system is operating). Furthermore, the embodiments also enable the participant to independently edit files. In light of these abilities, an owner may desire to learn where a participant is currently navigating/operating within his/her multi-file workspace.

By selecting the pin to participant's position option (e.g., the options can be selectable buttons), the embodiments automatically navigate the owner to the same location as a participant within the workspace. If there are multiple participants, then the owner may initially be prompted to select a particular participant. As an example, suppose an owner is editing File 1 shown in the user interface 515 in FIG. 5. At the same time, a participant may be independently editing File 2. By clicking the pin to participant's position option, the owner can be automatically navigated to File 2, and in particular to the exact location where the participant is editing File 2. Therefore, although the embodiments enable participants to independently navigate and edit the files within the workspace, the embodiments also enable the owner to be automatically directed to the locations within the workspace where the participants are working. In some embodiments, this feature is also provided to each of the participants. Therefore, in these embodiments, each collaborator is able to follow the actions of the other collaborators.

Another option that may be provided among the set of new collaboration options 525 is the option to adjust the access controls of the participants. For example, the owner may be provided with an option to adjust a policy so that participants are allowed to navigate to or edit only certain files. Yet another option is related to an audit feature in which the actions of the participants are recorded and are made available for viewing by the owner. Accordingly, the integration component 510 is able to interact with the client application 505 to enhance the owner's control over the participants in a collaboration session.

Returning to FIG. 4, attention will now be directed to the participant computer system 410. Here, the participant computer system 410 is shown as including a collaboration agent 445, a client application 450, an integration component 455, and local files 460. Here, the collaboration agent 445 communicates with the collaboration agent 415 to provide the participant computer system 410 access to the multi-file workspace residing on the owner computer system 405. In this manner, communication between the owner computer system 405 and the participant computer system 410 is facilitated/conducted between the owner computer system's agent component (e.g., a collaboration agent 415) and the participant computer system's agent component (e.g., collaboration agent 445). Additional details on this interaction will be presented later. At this point, it is worthwhile to note that the client application 450 also provides a user interface to the participant so that the participant is able to view (and therefore work on) the multi-file workspace.

Similar to the integration component 435, the integration component 455 also attaches itself to the client application 455. The functionalities of this integration component 455 will now be discussed in relation to FIGS. 6A and 6B.

Figure 6B:
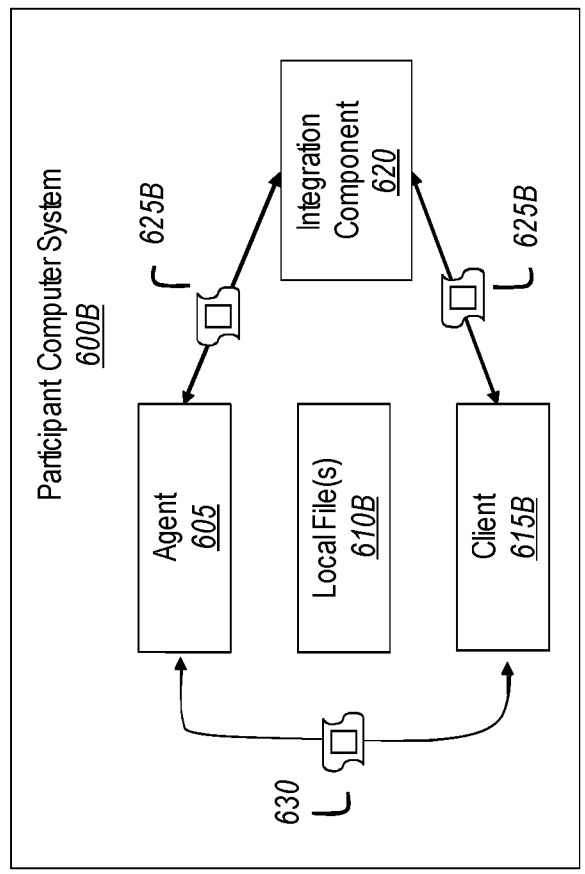
FIG. 6B illustrates how a client application's communications can be intercepted and re-routed.
Figure 6A:
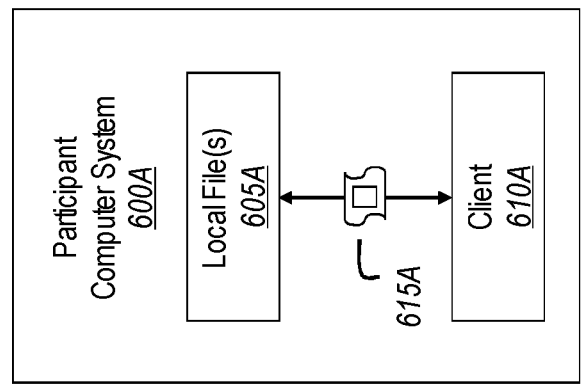
FIG. 6A illustrates how a client application is able to access the local files on a participant computer system.

FIG. 6A shows a participant computer system 600A that includes a set of local files 605A, which are analogous to the local files 460, and a client application 610A. In this scenario, the participant computer system 600A does not have an integration component. Accordingly, when the participant computer system 600A is thusly configured, the client application 610A is able to submit requests 615A to the set of local files 605A. In this manner, the client application 610A operates on files that are stored locally on the participant computer system 600A.

To enable a participant computer system to operate on a remote multi-file workspace in an operating system agnostic and client application agnostic manner, the participant computer system uses a collaboration agent and an integration component. These features are shown in FIG. 6B. For example, the participant computer system 600B of FIG. 6B includes a collaboration agent 605, a set of local files 610B, a client application 615B, and an integration component 620. After attaching itself to the client application 615B, the integration component 620 is able to intercept requests 625B that are issued by the client application 615B. Normally, these requests 625B would be fulfilled using the set of local files 610B. Now, instead of the requests 625B being fulfilled using the information from the set of local files 610B, the integration component 620 intercepts those requests 625B and routes the intercepted requests 625B to the collaboration agent 605. Once the requests 625B are received, the collaboration agent 605 then routes the intercepted requests 625B to a collaboration agent residing on the owner computer system (e.g., collaboration agent 415 in FIG. 4).

Figure 7:
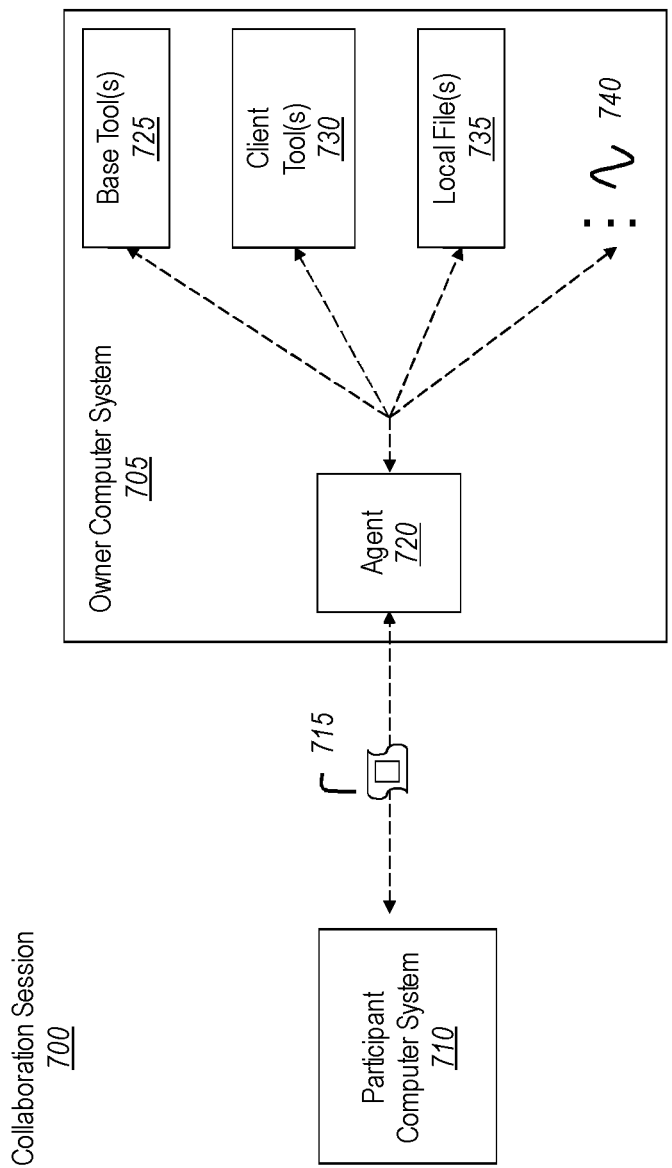
FIG. 7 demonstrates how an owner computer system is able to process requests submitted by a participant computer system.

Turning briefly to FIG. 7, FIG. 7 shows how an owner-side collaboration agent handles requests that are received from a participant-side collaboration agent. Here, the collaboration session 700 includes an owner computer system 705 and a participant computer system 710. The owner computer system 705 includes a collaboration agent 720, a set of base tools 725, a set of client tools 730, and a set of local files 735. The ellipses 740 demonstrates that the owner computer system 705 may have additional features.

In this scenario, a participant-side collaboration agent is able to receive an intercepted request as described in connection with FIG. 6B. This request is shown as request 715 in FIG. 7. Here, the participant-side collaboration agent transmits the request 715 to the collaboration agent 720. After receiving the request 715, the collaboration agent 720 then processes the request 715. In some instances, processing the request 715 includes making the set of base tools 725 accessible to the participant computer system 710. Relatedly, processing the request 715 may include making the set of client tools 730 accessible to the participant computer system 710. In other instances, processing the request 715 may include making the set of local files 735 accessible to the participant computer system 710. In this manner, a multi-file workspace residing on the owner computer system 705 may be made accessible to the participant computer system 710. In some instances, processing the request 715 includes making edits to the files in the multi-file workspace. Edits include, but are not limited to, changing text within the file, adding a new file, deleting an existing file, or any other file editing operations.

Here, it is worthwhile to note that the participant computer system 710 is not downloading the multi-file workspace. Instead, it is being given access to the workspace through the use of its collaboration agent, its integration component, and the owner-side collaboration agent. In this manner, the participant computer system 710 is able to reach across and perform work on the owner computer system 705's multi-file workspace. After the request 715 is processed by the owner computer system 705, the collaboration agent 720 then transmits a response back to the participant computer system 710. In particular, the collaboration agent 720 transmits the response back to the participant-side collaboration agent.

Returning to FIG. 6B, the collaboration agent 605 will then receive any responses generated by an owner computer system. Once a response is received, then some embodiments will cause the response to be transmitted back to the client application 615B via the integration component 620. In other embodiments, however, the collaboration agent 605 is able to directly transmit the response (e.g., response 630) to the client application 615B. In this manner, the participant is able to see the results of his/her processed requests.

Here, an example will be helpful. Suppose an owner establishes a collaboration session in which a participant is a member. The owner has asked the participant to assist him/her in debugging source code. The owner begins by debugging a first file while the participant begins by debugging a second file. Of note, both of these files are included in the multi-file workspace and both are stored on the owner's computer system. In this example, the second file is displayed on the participant's computer system even though the file's contents are actually stored only on the owner's computer system.

Additionally, the participant is able to independently view and edit the contents of the second file even though the owner is currently working on the first file. In this manner, multiple collaborators are able to jointly work on a single multi-file workspace. In some instances, the owner and the participant will be working on the same file. When such a scenario is present, then the owner will be able to see (in real-time) the changes made by the participant, and the participant will be able to see (in-real time) the changes made by the owner. Accordingly, the changes made by the collaborators are made in real-time and are synchronized with each other. In light of this discussion, it will be appreciated that the participant is given the illusion that he/she is working on a local workspace whereas, in actuality, the workspace is not local.

By following these principles, the disclosed embodiments are able to provide a participant computer system access to a multi-file workspace that is stored on the owner computer system. Furthermore, a human participant is able to view that workspace and to edit that workspace. This viewing and editing can be performed independently of any viewing and editing that an owner may be performing on the multi-file workspace. In this manner, a participant no longer needs to replicate a workspace's context in order to work on that workspace. Additionally, the participant is able to use his/her preferred client application, even if that client application is different from the owner's client application. Even further, the participant is able to use the owner's set of tools, which tools understand the entire context of the multi-file workspace.

Figure 8:
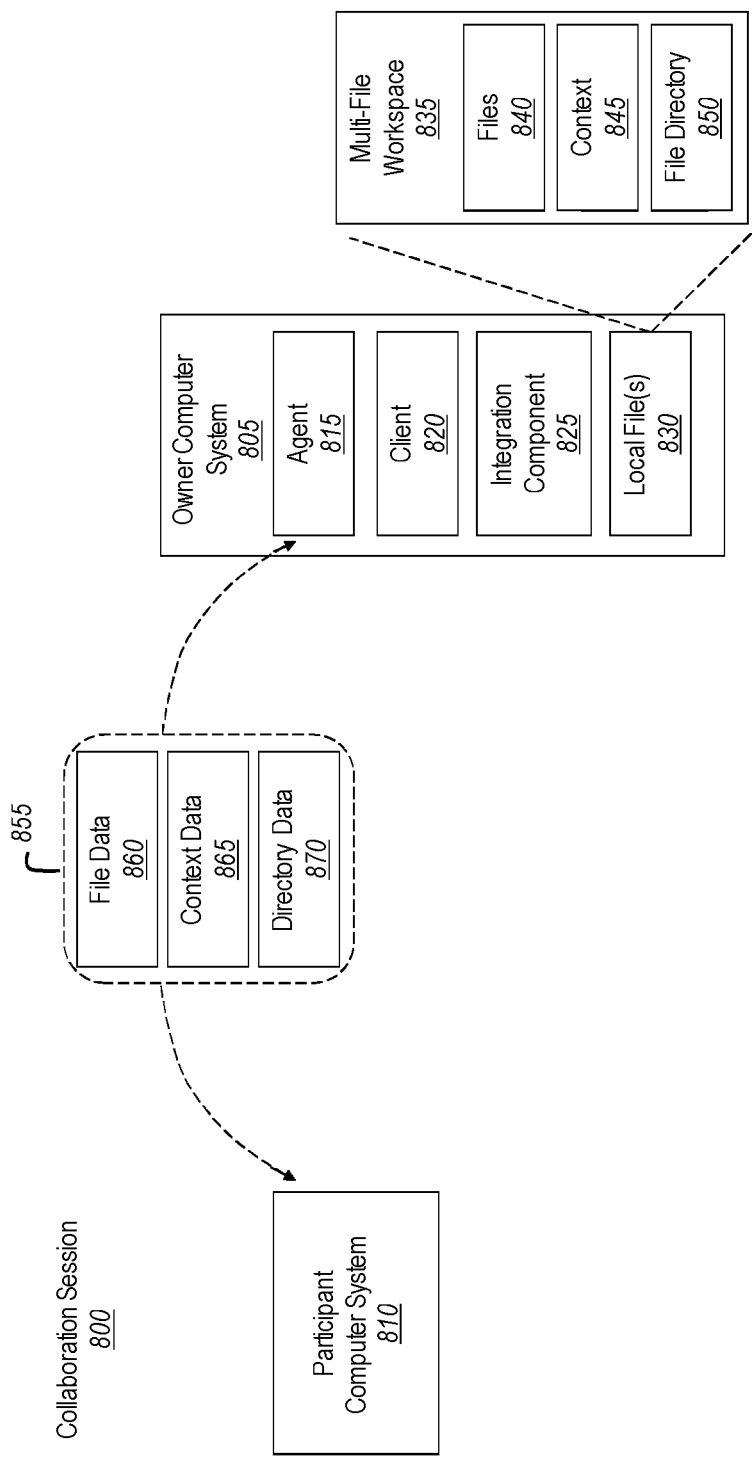
FIG. 8 demonstrates how a multi-file workspace can become accessible to a participant computer system.

Attention will now be directed to FIG. 8, which provides additional details for enabling a participant to collaborate on a multi-file workspace. Here, the collaboration session 800 includes an owner computer system 805 and a participant computer system 810. The owner computer system 805 includes a collaboration agent 815, a client application 820, an integration component 825, and a set of local files 830. The set of local files 830 includes a multi-file workspace 835. Here, this multi-file workspace 835 includes a set of files 840, a context 845 of the multi-file workspace 835, and a file directory 850.

When the collaboration agent 815 receives a request from the participant computer system 810 according to the manner just described, the collaboration agent 815 is able to process the request and return a response 855 to the participant computer system 810. As shown, this response 855 may include file data 860 (i.e. data concerning the set of files 840), context data 865 (i.e. data concerning the context 845), or directory data 870 (i.e. data concerning the file directory 850). In some instances, this data is metadata while in other instances this data enables the participant computer system 810 to display the multi-file workspace and receive edits directed to the multi-file workspace. In this manner, providing the participant computer system 810 access to the multi-file workspace includes providing access to the workspace's file directory, context, and files. From this information, the multi-file workspace 835 can be displayed on the participant computer system 810, and the participant will be able to operate on that multi-file workspace.

From the above disclosure, it will be appreciated that the owner computer system 805 is transmitting sufficient information (e.g., metadata and other information) so that the participant computer system 810 is able to understand what is included within the multi-file workspace 835. Furthermore, the participant computer system 810 is able to receive enough information so that a visualization of the multi-file workspace 835 may be rendered on a user interface of the participant computer system 810. In this manner, the participant computer system 810 is acting as a headless entity because a majority of the operations are actually being performed on the owner computer system 805.

For example, the participant computer system 810 submits viewing and editing requests to the owner computer system 805. The owner computer system 805 then processes those requests and returns results back to the participant computer system 810. As such, the participant computer system 810 is provided the illusion that it is working on a local workspace, but in actuality the workspace is not local and the operations on the workspace are being performed by the owner computer system 805.

Figure 9:
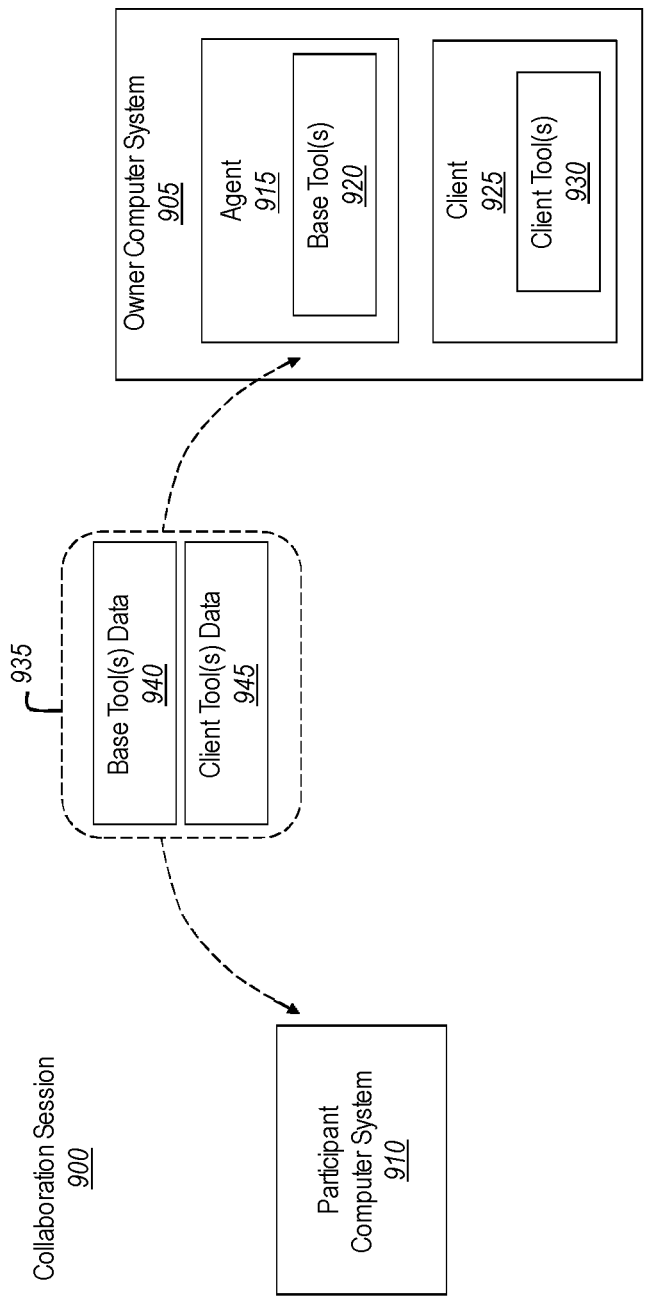
FIG. 9 demonstrates how the tools of an owner computer system can become accessible to a participant computer system.

FIG. 9 shows some additional operations that may be performed. Here, the collaboration session 900 includes an owner computer system 905 and a participant computer system 910. The owner computer system 905 includes a collaboration agent 915. As discussed, this collaboration agent 915 is able to maintain a set of base tools 920. The owner computer system 905 also includes a client application 925, which client application 925 is able to maintain a set of client tools 930.

According to the principles discussed herein, the embodiments are also able to make the set of base tools 920 and the set of client tools 930 accessible to the participant computer system 910. For example, the participant computer system 910 is able to use the tools that are residing on the owner computer system 905 in order to perform operations on the owner computer system 905's multi-file workspace. Therefore, not only is the participant computer system 910 able to view and edit the multi-file workspace on the owner computer system 905, but it is also able to make use of the tools that are on the owner computer system 905. The participant computer system 910 is able to receive information 935 that includes base tool data 940 and/or client tool data 945. In this manner, the participant computer system 910 is able make use of the owner computer system 905's development tools.

Remoting the Language Services of One Computer System to Another

As used herein, the phrase "language service" refers to various different source code editing features and functionalities. Earlier in this disclosure, reference was made to a set of base tools 420 shown in FIG. 4. Some of the functionalities that were discussed in relation to those base tools 420 are provided by a language service. For example, a language service is able to provide a code completion service (e.g., code hinting), a code navigation operation/service, a code colorization service (e.g., syntax highlighting in which different colors are applied to the syntax depending on what category a syntax term belongs to), a code refactoring service (e.g., restructuring code without altering its behavior), a source code search service, a source code control service, and/or a lightbulb service (e.g., an icon service that provides an expanded display of options).

A language service may also provide parameter information (e.g., variable values and watch lists), member lists, symbol services, source code transpilation, hinting, hover features, and quick information. Therefore, based on this disclosure, it will be appreciated that a language service may include any feature that helps a user better understand the contents of source code. The terms "IntelliSense," "Code Completion," "Code Hinting," and/or "Content Assist" are analogous terms to "language service."

In some cases, a language service provides these features by analyzing the source code to determine its language semantics as a whole (i.e. across multiple files). In other words, the language service is able to analyze the entire context of a program's source code. As generally discussed throughout this disclosure, the term "context" refers to the state of a multi-file workspace.

For most applications, the entirety of the source code is not included in a single file. Instead, the application is comprised of a plurality of source code files. With this understanding, it will be appreciated that each file may have its own context. Furthermore, the entire workspace, as whole, may have an overarching context. Here, it is worthwhile to note that analyzing the context of a single file may not be sufficient to completely understand that file. For instance, the file may depend on one or more other files. Relatedly, that file may have other files that depend on it.

As an example only, there may be a global variable defined in one file of the multi-file workspace. Because of its global nature, that variable may be used in a different file as well. When editing that global variable in a source code file, the file's context and/or the workspace's context may be referenced so as to provide relevant code completion recommendations for the edits associated with that global variable. Here, it will be appreciated that the language service is able to access the workspace's entire context as well as an individual file's context.

For example, the language service is able to identify an unreferenced object (e.g., perhaps a collaborator is working with a global variable) that is currently being used within the collaboration session. Furthermore, the language service is able to reach outside of the current codebase (e.g., the file that the participant is currently working on) of that unreferenced object to identify one or more known objects (e.g., the global variable may be defined in a different file). In response, the language service may then cause the initial unreferenced object to be referenced to the known objects. In this manner, the language service is able to access the workspace's entire context so that the global variable may be properly referenced. The above description is for example purposes only and should not be construed as limiting. Accordingly, it will be appreciated that a workspace's context may be used to describe the interactions that occur in a multi-file workspace.

As another example, when making edits to a file (as well as to get proper assistance while typing), the embodiments are able to reference context from outside of the immediate file. To clarify, some embodiments are configured to draw from other file contexts or even from the overarching context to ensure that the correct features are provided when the edits are being made.

Here, it is worthwhile to note that the problem of providing the correct context for a language service escalates even further when multiple parties are editing multiple documents within a single multi-file workspace at the same time. For example, consider a scenario in which one collaborator edits a definition of a global variable that is used throughout multiple files. If other collaborators are relying on that global variable, then confusion may abound if the language service does not properly update the definition and/or if the other collaborators are not made aware of the changes. In view of these difficulties, the disclosed embodiments are able to offer comprehensive language services to all of the collaborators who are joined in a collaboration session.

FIG. 10 shows an example scenario of some of the features of a language service. To illustrate, FIG. 10 shows a body of source code 1000. As a user begins to type (e.g., typing action 1005 in which the letter "c" has been added to the source code 1000), a language service is able to provide various code completion options 1010. Of note, these options are based on the text that was entered. For example, the user typed the letter "c." In response, the language service is able to provide the code completion options 1010, which all begin with the letter "c." In this manner, the language service is able to monitor edits made to the body of source code 1000 to provide the code completion options 1010.

In some situations, the language service maintains and updates a knowledge bank associated with the multi-file workspace. Further, the language service may continuously update this knowledge bank in order to stay up to date on (i.e. reflect) any new changes that are made to the workspace's context (e.g., changes to the code). As an example, when an edit to a body of source code is initiated by either a participant computer system or the owner computer system, the knowledge bank is updated to include this edit. As a result, the owner computer system and the participant computer systems, both of which are using the owner computer system's language service, may be made aware of the edit.

Additionally, the language service is able to automatically update the workspace's files to reflect any new changes. As an example, suppose a global variable is defined in a first file. If that definition is changed in some manner (e.g., perhaps the spelling is changed), the language service is able to update some or all of the other uses of that global variable in the workspace. To illustrate, if the global variable is used in a second file, the language service is able to automatically update the global variable in the second file to correspond to the changes that were made in the first file. In this manner, the language service is able to maintain a global understanding of the multi-file workspace.

Figure 11:
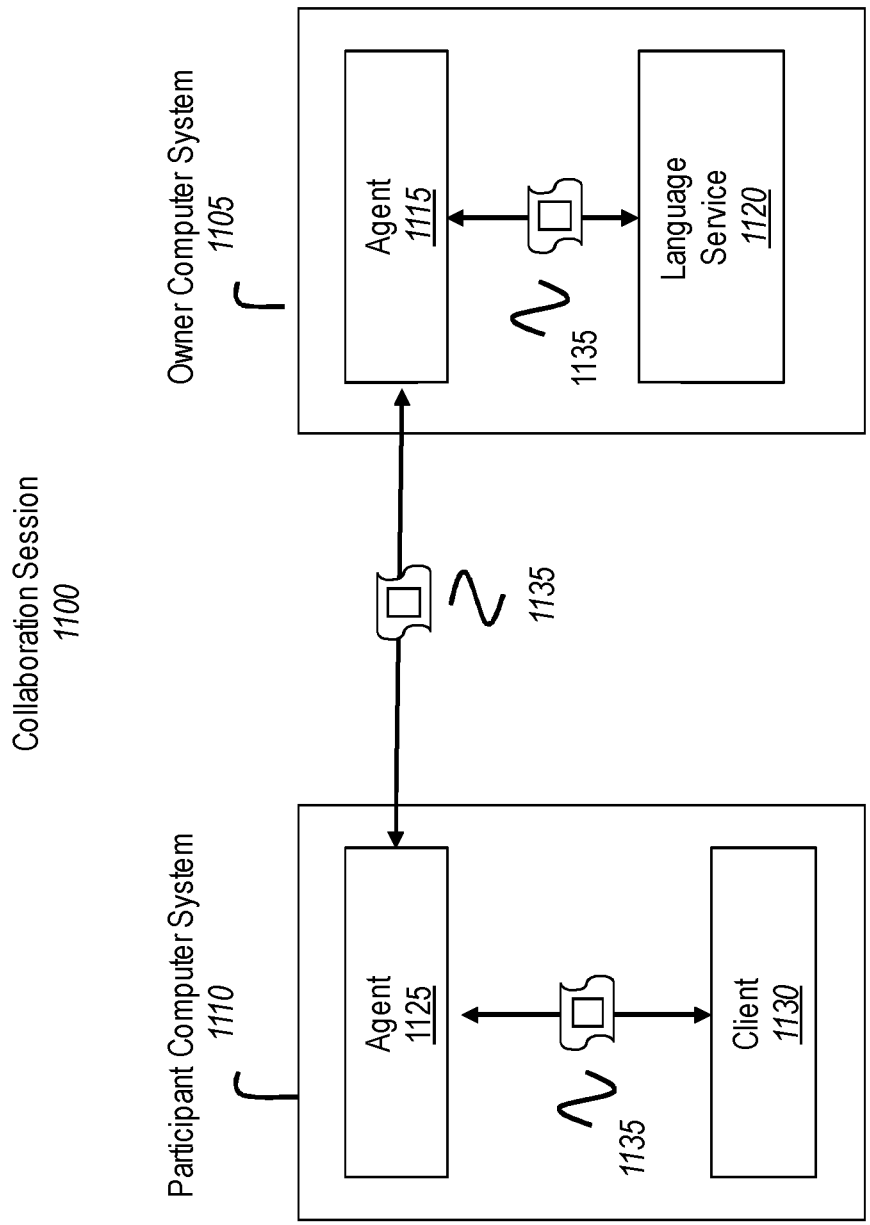
FIG. 11 depicts an example architecture for remoting the language service of one computer system to another computer system.
Figure 12:
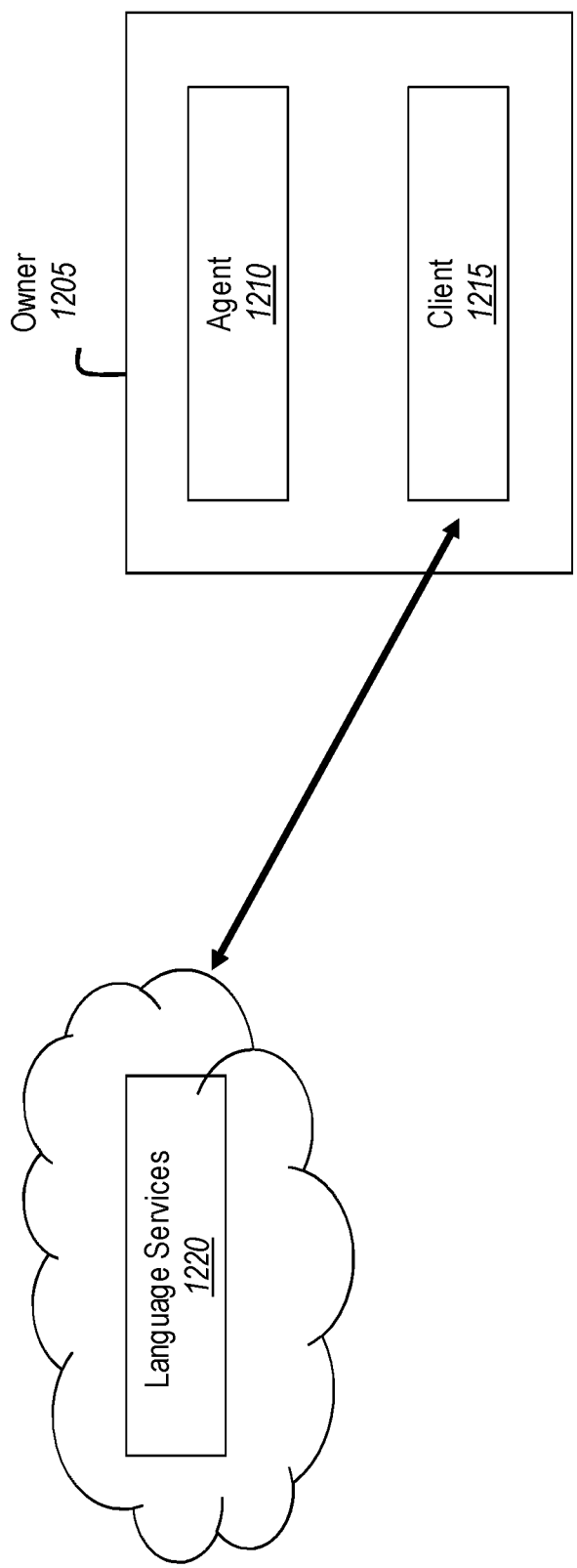
FIG. 12 demonstrates that a language service can reside in the cloud.

Having just described a basic overview of a language service, attention will now be directed to FIGS. 11 and 12. These figures illustrate a revolutionary architecture for remoting the language services of one computer system (i.e. the owner computer system) to one or more other computer systems (i.e. a participant computer system).

One approach to providing language services in a collaborative environment is to obtain the entire set of files needed to understand the full context of the application's source code. This approach is disfavored, however, because it is both expensive and rather difficult to completely replicate the environment in a manner to sufficiently satisfy the potentially large number of file dependencies.

In contrast to the above approach, some of the disclosed embodiments are configured to compute some (or all) of the data that is required to remote an owner computer system's language service. This data is then made available to the participant computer systems. For instance, based on the principles described earlier, the collaboration agent on the participant computer system is able to communicate with the collaboration agent on the owner computer system. While the participant computer system is given the appearance that it is operating on local files and directories, those files and directories are actually stored only on the owner computer system. This benefit is achieved through the communications between the various collaboration agents. According to the disclosed embodiments, the owner computer system's native language services can also be accessed by the collaboration agents on the participant computer systems.

By way of a brief background, many languages (e.g., C#, JavaScript etc.) are supported in coding environments with various standalone processes. These processes are able to compute some of the data that is required for a language service. Further, these processes are able to communicate, using a particular protocol, with a client application (e.g., an IDE). In this manner, the language service is able to provide code completion options while the source code is being edited within the IDE. Some of the disclosed embodiments publish these communications so that they are also accessible to the participant computer systems.

In many instances, there is also a common denominator protocol (e.g., Language Server Protocol) that the language service uses. The disclosed embodiments are able to make the owner computer system's language service available in such a way that the participant computer systems do not need to download any additional extensions for a particular programming language in order to get support for that language. Accordingly, attention will now be directed to FIG. 11 which illustrates an example architecture to remote the language service of one computer system (e.g., an owner computer system) to another computer system (e.g., a participant computer system). As used herein, the term "remote" refers to the process of making a language service available to another computer system.

In particular, FIG. 11 shows a collaboration session 1100 in which an owner computer system 1105 and a participant computer system 1110 are both members. Here, the owner computer system 1105 includes a collaboration agent 1115 and a language service 1120. As also shown, the participant computer system 1110 includes a collaboration agent 1125 and a client application 1130.

As a human participant uses the participant computer system 1110 to work on a multi-file workspace that is stored on the owner computer system 1105, the embodiments are able to remote the language service 1120 so that the features and functionalities of the language service 1120 are made available to the human participant.

The collaboration agent 1115 is able to use a Language Server Protocol ("LSP") to offer the language service 1120 to the participant computer system 1110. While traditional language service technologies depend on certain content stored on a local computer system, the disclosed embodiments enable a participant computer system to reach across to the owner computer system and use the owner computer system's language service. In this manner, the participant computer system need not locally store language service content. Instead, content stored on a remote computer system (i.e. the owner computer system) will be used. To clarify, the language service 1120 runs on the owner computer system 1105, and the participant computer system 1110 is permitted to access to the language service 1120. As a result, the language service 1120 that is used during the collaboration session 1100 is actually executing on only on a single computer system, namely, the owner computer system 1105.

Turning briefly to FIG. 12, some embodiments allow the language service to run as headless agent in the cloud. For example, FIG. 12 illustrates an example scenario where an owner computer system 1205 includes a collaboration agent 1210 and a client application 1215. In this scenario, the language service 1220 is actually a cloud service and is accessible to both the owner computer system 1205 and any participant computer systems via the cloud.

Here, the language service 1220 may be considered a "headless" agent in that the service is simply operating in the cloud while the owner computer system 1205 is the entity that determines how the language service 1220 is to be utilized. In such situations, the client 1215 may be light-weight/thin because it is not required to run the language service 1220 itself. In some embodiments, the agent 1210 coordinates how the participant computer systems access the language service 1220 while in other embodiments those participant computer systems are able to directly access the language service 1220.

Returning to FIG. 11, this figure shows a scenario in which the language service 1120 resides on the owner computer system 1105. As shown in this figure, a request 1135 may be relayed between the client 1130, the collaboration agent 1125, the collaboration agent 1115, and the language service 1120. By responding to the request 1135, the owner computer system 1105 is able to make its language service (i.e. language service 1120) available to the participant computer system 1110.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods may be implemented by one or more processors of a computer system (e.g., the computer system 100 of FIG. 1). By way of example, a computer system includes one or more computer-readable hardware storage media that store computer-executable code. This computer-executable code is executable by the one or more processors to cause the computer system to perform these methods.

Figure 13:
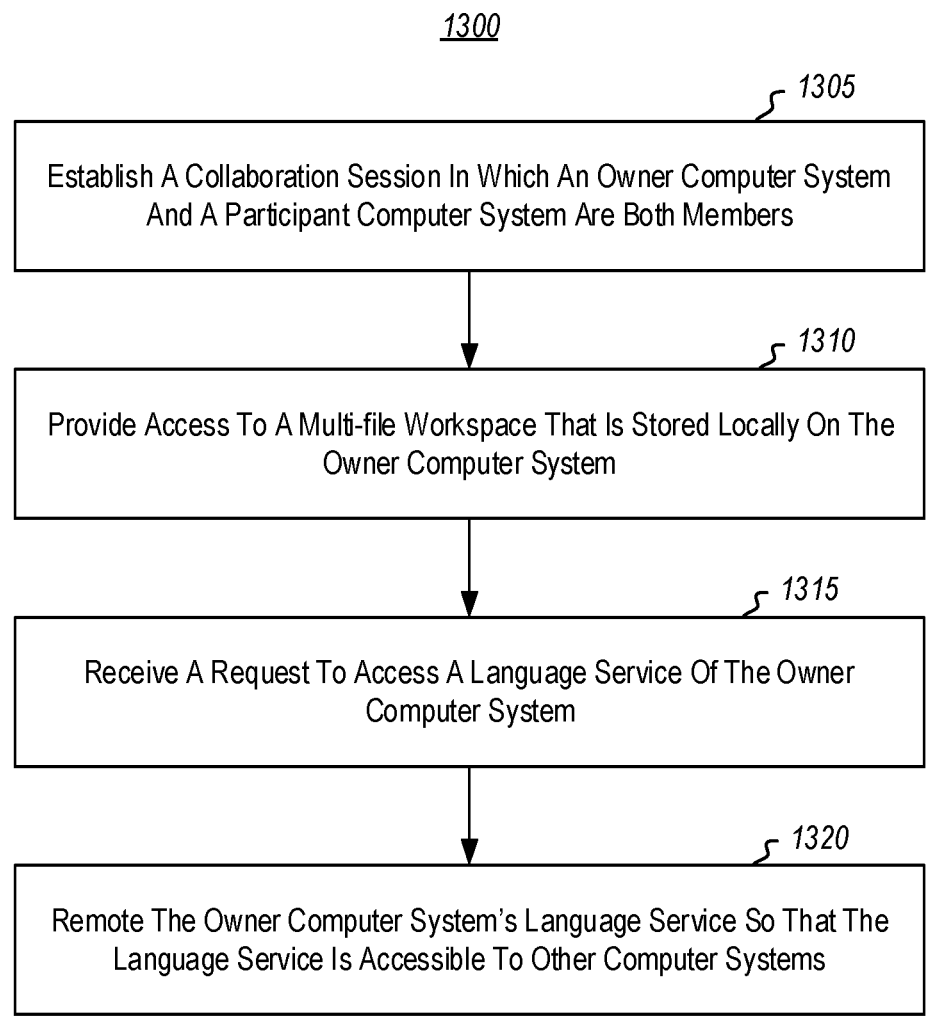
FIG. 13 presents an example method for remoting the language service of one computer system to another computer system.

FIG. 13 illustrates an example method 1300 for remoting the language service of one computer system so that the language service is available for use by another computer system. Initially, method 1300 includes an act of establishing a collaboration session in which an owner computer system and a participant computer system are both members (act 1305). Within this collaboration session, access to a multi-file workspace is provided to the owner and participant computer systems (act 1310). Of note, this multi-file workspace is stored locally on the owner computer system. Here, these acts may be performed by the collaboration agent 1115 shown in FIG. 11.

Method 1300 also includes an act of receiving a request to access a language service of the owner computer system (act 1315). For example, the request may be the request 1135 shown in FIG. 1300. Further, the request may be received by the collaboration agent 1115 and/or the language service 1120.

Finally, method 1300 includes an act of remoting the owner computer system's language service so that the language service is accessible to the participant computer system (act 1320). Here, this act may also be performed by a combination of the collaboration agent 1115 and the language service 1120.

Accordingly, some of the disclosed embodiments enable collaborators in a collaboration session to each simultaneously use an owner computer system's language service. Here, each collaborator may be provided with an instance of the owner computer system's language service. As an example, an instance of the owner computer system's language service may be provided to the owner computer system, and an instance of the owner computer system's language service may be provided to each of the participant computer systems at the same time. In this manner, the embodiments are able to provide a single service to multiple collaborators by providing each collaborator with an instance of that service. In other scenarios, the embodiments are able to provide multiple services to multiple collaborators. Even further, the embodiments are able to provide multiple instances of multiple services to multiple collaborators. Accordingly, the collaborators are able to understand a workspace's entire context while making edits to that workspace. As a result, significant advantages are realized because efficient edits can be made on a multi-file workspace.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An owner computer system comprising:
   one or more processors; and
   one or more computer-readable hardware storage devices having stored thereon computer-executable instructions that are structured to be executable by the one or more processors to thereby cause the owner computer system to:
      within a collaboration session in which the owner computer system and a participant computer system are both members, provide access to a multi-file workspace that is stored locally on the owner computer system, wherein the access is provided to both the owner computer system and the participant computer system;
      receive a request to access a language service of the owner computer system, the request originating from the participant computer system; and
      remote the owner computer system's language service so that the language service is accessible to the participant computer system, the language service of the owner computer system being configured to update a knowledge bank of language semantics of the multi-file workspace that is stored locally on the owner computer system when an edit to the multi-file workspace is initiated by the participant computer system that has access to the multi-file workspace, wherein the knowledge bank of language semantics of the multi-file workspace is operable to enable functionality of one or more code development tools.

2. The owner computer system of claim 1, wherein the language service is configured to:
   identify an unreferenced object that is currently being used within the collaboration session;
   reach outside of a current codebase of the unreferenced object to identify one or more known objects; and
   cause the unreferenced object to be referenced to the one or more known objects during a subsequent use of the unreferenced object.

3. The owner computer system of claim 1, wherein the language service includes a navigation operation that is usable within the multi-file workspace.

4. The owner computer system of claim 1, wherein the language service provides one or more of the following: a member list, parameter information, code completion, code navigation, code colorization, code refactoring, symbol service, lightbulbs, or quick information.

5. The owner computer system of claim 1, wherein the language service provides one or more of the following: source code transpilation, hinting, hover features, or highlighting.

6. The owner computer system of claim 1, wherein the multi-file workspace includes multiple files of source code, and wherein the language service analyzes the source code to determine language semantics of the source code as a whole across the multiple files.

7. The owner computer system of claim 1, wherein the language service provides code completion recommendations while a file in the multi-file workspace is being edited.

8. The owner computer system of claim 1, wherein the multi-file workspace includes multiple files of source code, and wherein the language service is provided to both the owner computer system and the participant computer system at a same time.

9. The owner computer system of claim 8, wherein the owner computer system is made aware of edits to the multiple files of source code.

10. The owner computer system of claim 1, wherein an agent component residing on the owner computer system receives the request from an agent component residing on the participant computer system, whereby communication between the owner computer system and the participant computer system is conducted between the owner computer system's agent component and the participant computer system's agent component.

11. The owner computer system of claim 1, wherein a client application resides on the owner computer system, the client application being an integrated development environment, wherein the multi-file workspace includes multiple files of source code, and wherein the language service provides code completion while the source code is being edited within the integrated development environment.

12. The owner computer system of claim 1, wherein the one or more code development tools that are enabled by the knowledge bank of language semantics of the multi-file workspace that is stored locally on the owner computer system are accessibly by both the owner computer system and the participant computer system.

13. A method for providing language services of one computer system to multiple other computer systems, the method being implemented by one or more processors of an owner computer system, the method comprising:
within a collaboration session in which the owner computer system and a participant computer system are both members, providing access to a multi-file workspace that is stored locally on the owner computer system, wherein the access is provided to both the owner computer system and the participant computer system;
receiving a request to access a language service of the owner computer system, the request originating from the participant computer system; and
remoting the owner computer system's language service so that the language service is accessible to the participant computer system, the language service of the owner computer system being configured to update a knowledge bank of language semantics of the multi-file workspace that is stored locally on the owner computer system when an edit to the multi-file workspace is initiated by the participant computer system that has access to the multi-file workspace, wherein the knowledge bank of language semantics of the multi-file workspace is operable to enable functionality of one or more code development tools.

14. The method of claim 13, wherein the language service provides one or more of the following: source code transpilation, hinting, hover features, or highlighting.

15. The method of claim 13, wherein the multi-file workspace includes multiple files of source code, and wherein the language service analyzes the source code to determine language semantics of the source code as a whole across the multiple files.

16. The method of claim 13, wherein a client application resides on the owner computer system, the client application being an integrated development environment, wherein the multi-file workspace includes multiple files of source code, and wherein the language service provides code completion while the source code is being edited within the integrated development environment.

17. The method of claim 13, wherein the collaboration session includes three or more members, the owner computer system being a first member, the participant computer system being a second member, and a second participant computer system being a third member.

18. One or more hardware storage devices having stored thereon computer-executable instructions that are structured to be executable by one or more processors of an owner computer system to thereby cause the owner computer system to:
within a collaboration session in which the owner computer system and a participant computer system are both members, provide access to a multi-file workspace that is stored locally on the owner computer system, wherein the access is provided to both the owner computer system and the participant computer system;
receive a request to access a language service of the owner computer system, the request originating from the participant computer system; and
remote the owner computer system's language service so that the language service is accessible to the participant computer system, the language service of the owner computer system being configured to update a knowledge bank of language semantics of the multi-file workspace that is stored locally on the owner computer system when an edit to the multi-file workspace is initiated by the participant computer system that has access to the multi-file workspace, wherein the knowledge bank of language semantics of the multi-file workspace is operable to enable functionality of one or more code development tools.

19. The one or more hardware storage devices of claim 18, wherein the multi-file workspace includes multiple files of source code, and wherein the language service analyzes the source code to determine language semantics of the source code as a whole across the multiple files.

20. The one or more hardware storage devices of claim 18, wherein the multi-file workspace includes multiple files of source code.

* * * * *